(12) United States Patent
Ono et al.

(10) Patent No.: US 12,515,612 B2
(45) Date of Patent: Jan. 6, 2026

(54) HYBRID INFLATOR

(71) Applicant: TOYODA GOSEI CO., LTD., Kiyosu (JP)

(72) Inventors: Yoshio Ono, Kiyosu (JP); Shinichi Hayakawa, Kiyosu (JP); Kosuke Shigeta, Kiyosu (JP); Akira Suzuki, Kiyosu (JP); Masaaki Mori, Kiyosu (JP); Hiroaki Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 614 days.

(21) Appl. No.: 17/969,203

(22) Filed: Oct. 19, 2022

(65) Prior Publication Data
US 2023/0117476 A1    Apr. 20, 2023

(30) Foreign Application Priority Data
Oct. 20, 2021    (JP) .................................. 2021-171808

(51) Int. Cl.
*B01J 7/00*    (2006.01)
*B60R 21/272*    (2006.01)

(52) U.S. Cl.
CPC ............... *B60R 21/272* (2013.01); *B01J 7/00* (2013.01)

(58) Field of Classification Search
CPC ........ B01J 7/00; B60R 21/264; B60R 21/272; B60R 21/274; B60R 2021/2725; B60R 2021/26076
See application file for complete search history.

(56) References Cited

U.S. PATENT DOCUMENTS

| 3,117,424 A | * | 1/1964 | Hebenstreit ............... B63C 9/18 62/48.1 |
| 3,951,428 A | * | 4/1976 | Sugiura ................. B60R 21/272 137/68.13 |
| 2011/0233908 A1 | | 9/2011 | Chen et al. |
| 2018/0045370 A1 | | 2/2018 | Nakashima et al. |

FOREIGN PATENT DOCUMENTS

| JP | S49120335 A | 11/1974 |
| JP | H07-205751 A | 8/1995 |
| JP | 2003-145119 A | 5/2003 |
| JP | 2007-154968 A | 6/2007 |
| JP | 2011-201524 A | 10/2011 |
| JP | 2011225197 A | 11/2011 |
| JP | 2018-024915 A | 2/2018 |

OTHER PUBLICATIONS

Office Action mailed May 21, 2024 in corresponding Japanese patent application No. 2021171808 (and English translation).

* cited by examiner

*Primary Examiner* — Lessanework Seifu
(74) *Attorney, Agent, or Firm* — Posz Law Group, PLC

(57) ABSTRACT

In a hybrid inflator, a housing houses a gas generator to generate a combustion gas in a housing recessed portion on a bottom portion side. A lid body provided at an outflow port of the housing and a lid body provided at a sealed portion side of a pressurized gas in a bottle in a gas discharge port portion separate the sealed portion of the pressurized gas in the bottle from outside. When the hybrid inflator is activated, the two lid bodies are broken by generation of the combustion gas from the gas generator, and whereby the pressurized gas is discharged from a discharge port of the gas discharge port portion. The gas generator is detachably assembled to the housing with respect to the housing recessed portion of the housing.

7 Claims, 20 Drawing Sheets

HYBRID INFLATOR

CROSS-REFERENCE TO RELATED APPLICATIONS

The present application claims the benefit of priority of Japanese Patent Application No. 2021-171808, filed on Oct. 20, 2021, the content of which is incorporated herein by reference.

TECHNICAL FIELD

The present invention relates to a hybrid inflator that is used in an airbag device mounted on an automobile or the like and supplies a pressurized gas to an airbag or the like when the hybrid inflator is activated.

BACKGROUND ART

A hybrid inflator used in a curtain airbag device or the like of a vehicle is known. In a hybrid inflator of the related art, a housing that houses a gas generator is connected to a bottle in which a pressurized gas such as argon gas is sealed. When the hybrid inflator is activated, a combustion gas is ejected from the gas generator, a lid body that blocks the pressurized gas in the bottle is broken due to shock waves and an increase in an internal pressure at that time, the pressurized gas is discharged from a discharge port of a gas discharge port portion provided in the bottle, and the curtain airbag and the like are inflated (see, for example, JP2011-201524A and JP2018-24915A). In addition, in the hybrid inflator of the related art, the gas generator includes a squib held by a holder and a gas generating agent that ignites the squib to generate the combustion gas. In the housing, the gas generator is housed in a housing recessed portion on a bottom portion side, and an outflow port through which the combustion gas can flow out is provided on a front end portion side. The bottle covers an outflow port side of the housing, holds the housing, and seals the pressurized gas. The bottle includes the gas discharge port portion provided with the discharge port that discharges the pressurized gas. Breakable lid bodies for sealing the pressurized gas in the bottle are respectively provided at the outflow port of the housing and a sealed portion side of the pressurized gas in the bottle in the gas discharge port portion. In this hybrid inflator, when the hybrid inflator is activated, the two lid bodies are broken by generation of the combustion gas of the gas generating agent by the ignition of the squib in the gas generator, and whereby the pressurized gas is discharged from the discharge port of the gas discharge port portion. Then, a locking edge provided on an edge of the housing recessed portion on the bottom portion side of the housing is caulked so as to be plastically deformed, the locking edge is locked to the edge on the bottom portion side of the holder of the gas generator housed in the housing recessed portion, and whereby the gas generator is assembled to the housing.

SUMMARY OF INVENTION

From the viewpoint of resource saving and the like, it is conceivable to recover the hybrid inflator from the vehicle at the time of a waste vehicle and reuse the hybrid inflator. Since the pressurized gas for reuse is less likely to be deteriorated, it is conceivable that the bottle in which the pressurized gas is sealed or the housing is not discarded and reused, and the gas generator including the gas generating agent having a possibility of being deteriorated is replaced with a new one. However, in the gas generator of the related art, after the gas generator is housed in the housing recessed portion in the housing fixed to the bottle by welding or the like, a locking edge provided in the housing is caulked, the gas generator is fixed in the housing recessed portion, and thus the gas generator cannot be easily replaced. Even if the gas generator is removed by returning the caulking of the locking edge of the housing, a strength of the locking edge cannot be ensured and the housing cannot be reused again.

In order to solve the above problem, a hybrid inflator according to the present embodiment makes it easy to replace a gas generator, and makes it possible to reuse a pressurized gas, a bottle, and a housing.

A hybrid inflator according to the present embodiment includes.
  a gas generator including a squib held by a holder and a gas generating agent that ignites the squib to generate a combustion gas;
  a housing in which an outflow port through which the combustion gas is capable of flowing out is provided on a front end portion side;
  a bottle configured to cover the outflow port side to hold the housing, and provided with a gas discharge port portion having a discharge port for discharging a pressurized gas, in which the pressurized gas is sealed; and
  breakable lid bodies respectively provided at the outflow port of the housing and a sealed portion side of the pressurized gas in the bottle in the gas discharge port portion.

The housing houses the gas generator in a housing recessed portion on a bottom portion side.

The two lid bodies separate the sealed portion of the pressurized gas in the bottle from outside.

When the hybrid inflator is activated, the two lid bodies are broken by generation of the combustion gas of the gas generating agent by ignition of the squib in the gas generator, and whereby the pressurized gas is discharged from the discharge port of the gas discharge port portion.

The gas generator is detachably assembled to the housing with respect to the housing recessed portion of the housing.

An assembly structure of the gas generator and the housing is a structure in which the gas generator is attached to and detached from the housing so that the bottle and the housing held by the bottle are reusable.

In the hybrid inflator according to the present embodiment, the gas generator is assembled to the housing recessed portion of the housing as a detachable assembly structure, and at the time of reuse, the already attached gas generator can be removed, and a new gas generator can be easily assembled to the housing recessed portion.

Therefore, in the hybrid inflator according to the present embodiment, the gas generator can be easily replaced, and the pressurized gas, the bottle, and the housing can be easily reused.

In the hybrid inflator according to the present embodiment, the assembly structure may be a screw structure in which screw portions corresponding to each other are provided in the holder of the gas generator and the housing recessed portion of the housing.

Since the hybrid inflator according to the present embodiment has such an assembly structure, the gas generator to be replaced can be easily removed from the housing by turning the holder of the gas generator to be replaced and removing the screw portion (male screw portion) of the holder from the screw portion (female screw portion) of the housing recessed portion of the housing. Further, when a screw portion (male screw portion) of a holder of a new gas generator is screwed into the screw portion (female screw portion) of the housing recessed portion of the housing, replacement of the gas generator is completed. As described above, since the gas generator can be easily attached to and detached from the housing, even when the gas generator of the hybrid inflator needs to be replaced, the bottle in which the pressurized gas is sealed and the housing can be easily reused.

In the hybrid inflator according to the present embodiment, the assembly structure may be a bayonet structure having a claw portion provided at the holder of the gas generator and a groove portion provided in the housing recessed portion of the housing and into which the claw portion is inserted and locked.

Since the hybrid inflator according to the present embodiment has such an assembly structure, the holder of the gas generator to be replaced is turned to move the claw portion of the holder from a locking position of the groove portion to a position where the claw portion can be pulled out, and the gas generator to be replaced is pulled out, so that the gas generator to be replaced can be removed from the housing. Further, by inserting the claw portion of the holder of the new gas generator from an insertion position of the groove portion and rotating the claw portion to the locking position, the new gas generator can be assembled to the housing to be reused. Therefore, the hybrid inflator in which the bottle in which the pressurized gas is sealed and the housing are reused can be easily formed.

In the hybrid inflator according to the present embodiment, a fixing screw to be screwed and inserted into the holder of the gas generator from an outer peripheral surface side of the housing may be disposed, and the fixing screw may be a set screw.

In such a configuration, the fixing screw makes it difficult for the gas generator to come off from the housing, and an assembly strength of the gas generator with respect to the housing can be improved. In addition, since the fixing screw is formed of a set screw, it is difficult to visually observe the fixing screw, and it is possible to prevent an outsider from removing the gas generator from the housing.

In the hybrid inflator according to the present embodiment, the assembly structure may have a fitting shape in which the gas generator is fittable to the housing recessed portion of the housing, and include a coming-off preventing member configured to prevent the gas generator fitted to the housing recessed portion from coming off the housing recessed portion, and the coming-off preventing member may include a bottom wall portion that comes into contact with a bottom surface side of the gas generator, and a tubular portion that extends from an outer peripheral edge of the bottom wall portion and has an inner peripheral surface provided with a female screw portion that is screwed into a male screw portion provided on an outer peripheral side of the housing.

In such a configuration, when the coming-off preventing member is turned and removed from the housing, the bottom wall portion of the coming-off preventing member that has been in contact with the bottom surface side of the gas generator is removed and the gas generator can be taken out from the housing, and further, while a new gas generator is fitted to the housing recessed portion of the housing and the bottom wall portion of the coming-off preventing member is brought into contact with the bottom surface side of the new gas generator, when the female screw portion of the tubular portion of the coming-off preventing member is screwed into the male screw portion on the outer peripheral side of the housing, the new gas generator can be assembled to the housing to be reused, and the hybrid inflator in which the bottle in which the pressurized gas is sealed and the housing are reused can be easily formed.

In this case, a cap that is made of a synthetic resin and covers an outer periphery of an end portion of the bottle from an outer periphery of the tubular portion of the coming-off preventing member through an outer peripheral surface of the housing may be disposed.

In such a configuration, since the cap hides a vicinity of the male screw portion of the housing into which the coming-off preventing member is screwed, it is difficult to visually recognize an attachment state of the coming-off preventing member to the housing, and it is possible to prevent an outsider from removing the gas generator from the housing. In order to reuse the hybrid inflator, during removal of the gas generator, the cap may be broken, and the gas generator may be removed, and after a new gas generator is replaced, the gas generator may be covered with a new cap. In addition, the cap may be disposed by molding.

In a case of using the coming-off preventing member, a fixing screw to be screwed and inserted into the housing from an outer peripheral surface side of the coming-off preventing member may be disposed, and the fixing screw may be a set screw.

In such a configuration, the fixing screw makes it difficult for the gas generator to come off from the housing, and the assembly strength of the gas generator with respect to the housing can be improved. In addition, since the fixing screw is formed of a set screw, it is difficult to visually observe the fixing screw, and it is possible to prevent an outsider from removing the gas generator from the housing.

In the hybrid inflator according to the present embodiment, it is desirable that the holder or the coming-off preventing member to be assembled to the housing is formed by disposing an assembling operation portion corresponding to a dedicated tool so that the dedicated tool is used as a tool for an assembly operation.

In such a configuration, since the holder and the coming-off preventing member cannot be attached and detached unless the dedicated tool is used, it is possible to prevent an outsider from removing the gas generator from the housing.

BRIEF DESCRIPTION OF DRAWINGS

FIG. 3A shows an assembled state of a gas generator and FIG. 3B shows a removed state of the gas generator.

FIG. 6A shows an assembled state of a gas generator and FIG. 6B shows a removed state of the gas generator.

FIG. 8A shows a state before a gas generator is assembled to an inflator main body, FIG. 8B shows a state immediately after the gas generator is inserted into a groove portion, and FIG. 8C shows a state when assembly of the gas generator is completed.

FIG. 9A shows an assembled state of the gas generator and FIG. 9B shows a removed state of the gas generator.

FIG. 12A shows an assembled state of a gas generator and FIG. 12B shows a removed state of the gas generator.

FIG. 15A shows an assembled state of a gas generator and FIG. 15B shows a removed state of the gas generator.

FIG. 18A shows an assembled state of a gas generator and FIG. 18B shows a removed state of the gas generator.

DESCRIPTION OF EMBODIMENTS

Figure 1:
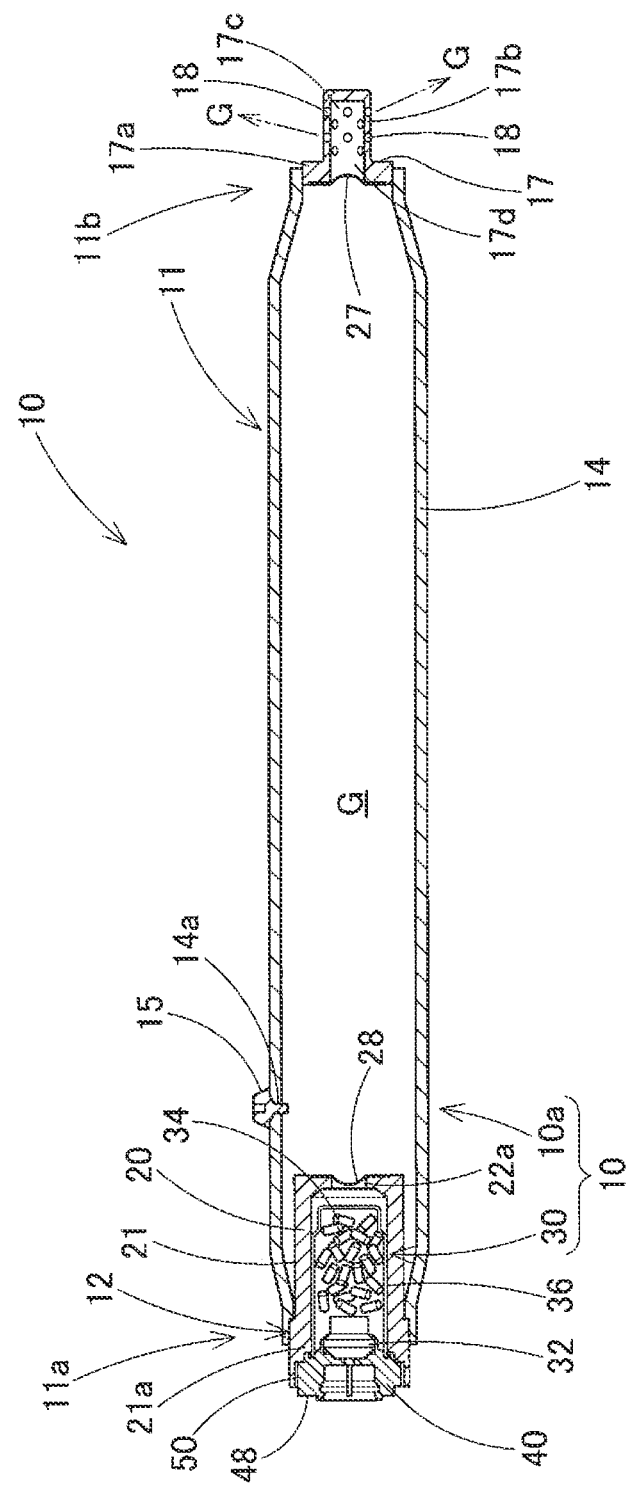
FIG. 1 is a schematic longitudinal sectional view of a hybrid inflator according to a first embodiment of the present invention.

Hereinafter, embodiments of the present invention will be described with reference to the drawings. An inflator 10 according to a first embodiment is a hybrid inflator that supplies an inflation gas to a curtain airbag of a curtain airbag device mounted on a vehicle.

As shown in FIGS. 1 to 3B, the inflator 10 includes a gas generator 30, a housing 20 that houses and holds the gas generator 30, and a bottle 11 that holds the housing 20. A pressurized gas G serving as an inflation gas for inflating an airbag is sealed in the bottle 11.

Since the gas generator 30 is replaceable, the inflator 10 according to the first embodiment includes an inflator main body 10a, which is a component of the inflator 10 other than the gas generator 30, and the gas generator 30. Specifically, the inflator main body 10a is a portion of the inflator 10 other than the gas generator 30, and includes the bottle 11 in which the pressurized gas G is sealed, and a housing 20 which is fixed to the bottle 11 and to which the gas generator 30 can be detachably assembled.

In the bottle 11, the housing 20 is fixed to a bottom portion 11a side, and a gas discharge port portion 17 is provided on a front end portion 11b side. The gas discharge port portion 17 has a plurality of discharge ports 18 for discharging the pressurized gas G sealed in the bottle 11. In the bottle 11, the pressurized gas G such as an argon gas filled from a filling opening 14a is sealed in a cylindrical main body portion 14 formed of metal such as steel. The filling opening 14a is closed by a plug 15 that is welded after the pressurized gas G is filled into the main body portion 14. The gas discharge port portion 17 is formed of a metal such as steel, includes a disk-shaped flange portion 17a and a tubular portion 17b, and is welded to a front end side of the main body portion 14. The tubular portion 17b has a bottomed cylindrical shape and protrudes from the flange portion 17a. The plurality of discharge ports 18 are provided in the tubular portion 17b so as to penetrate the inner and outer peripheries. A gas flow path 17c through which the pressurized gas G in the main body portion 14 passes is formed inside the tubular portion 17b. A burst disk (lid body) 27 made of a breakable metal plate or the like is provided on an inflow port 17d side of the gas flow path 17c so as to partition the gas flow path 17c and the main body portion 14 in which the pressurized gas G is sealed.

The housing 20 is provided on the bottom portion 11a side of the bottle 11 in the main body portion 14, and the housing 20 and the bottom portion 11a of the bottle 11 are joined to each other by welding at a fixing portion 12.

The housing 20 has a substantially cylindrical shape and is made of metal such as steel. A bottom portion 20a side of the housing 20 protrudes from the bottle 11, and a front end portion 20b side of the housing 20 is inserted into the bottle 11. The housing 20 includes a tubular peripheral wall portion 21 having an opening on the bottom portion 20a side, and a ceiling portion 22 provided at the front end portion 20b. The ceiling portion 22 is provided with an outflow port 22a. An inner peripheral side of the peripheral wall portion 21 is a housing recessed portion 21a for detachably housing the gas generator 30, and in particular, a female screw portion 53 is formed on an inner peripheral surface 21b of the housing recessed portion 21a on the bottom portion 20a side of the housing 20 (see FIGS. 3A and 3B). The female screw portion 53 functions as an assembling portion 25 for assembling a holder 40, which will be described later, in the gas generator 30.

The outflow port 22a of the ceiling portion 22 of the housing 20 allows the combustion gas ejected from the gas generator 30 to flow out into the bottle 11, and a burst disk (lid body) 28 made of a breakable metal plate or the like is disposed so as not to cause the pressurized gas G sealed in the bottle 11 to flow back to the housing 20 side before outflow of the combustion gas.

The gas generator 30 includes a squib 32 held by the holder 40, a gas generating agent 34 that ignites the squib 32 to generate the combustion gas, and a cup 36 that houses the gas generating agent 34 and is attached to the holder 40.

The gas generating agent 34 is configured by forming a predetermined drug capable of generating a predetermined combustion gas at the time of combustion into a predetermined shape (a substantially cylindrical shape in the case of the present embodiment), and is filled in the cup 36.

The cup 36 is made of a metal such as an aluminum alloy that can be broken (ruptured) when the combustion gas of the gas generating agent 34 is generated, and includes a ceiling portion 36a in a vicinity of the outflow port 22a and a cylindrical peripheral wall portion 36b extending from a peripheral edge of the ceiling portion 36a toward the holder 40 side. An end portion 36c of the peripheral wall portion 36b is caulked and coupled to a cup coupling portion 44 of the holder 40. The cup 36 is unnecessary when the housing 20 is directly filled with the gas generating agent 34.

The squib 32 includes an ignition portion 32a having a substantially truncated cone shape and two electrode pins 32b extending from the ignition portion 32a. In the squib 32, when an operation current flows through the electrode pin 32b, an ignition charge (not shown) in the ignition portion 32a is ignited to generate a flame, and the gas generating agent 34 is ignited by the flame. The electrode pin 32b protrudes so as to be exposed in a connector recessed portion 45 on a bottom surface 41c side of the holder 40.

The holder 40 is made of a metal such as steel or an aluminum alloy, and includes a substantially cylindrical tubular portion 41 and a ceiling portion 42 disposed on a front end side of the tubular portion 41. In the ceiling portion 42, the cup coupling portion 44 to which the end portion 36c of the cup 36 is coupled is disposed, and a squib housing portion 43 that houses and holds the ignition portion 32a of the squib 32 is disposed inside the cup coupling portion 44. The connector recessed portion 45 into which a connector (not shown) to be coupled to the electrode pin 32b is fitted is disposed on an inner peripheral surface 41b side of the bottom surface 41c side of the tubular portion 41.

A male screw portion 52 serving as an assembling portion 47 to be assembled to the assembling portion 25 of the housing 20 is formed on an outer peripheral surface 41a of the holder 40 in a vicinity of the bottom surface 41c of the tubular portion 41.

Figure 2:
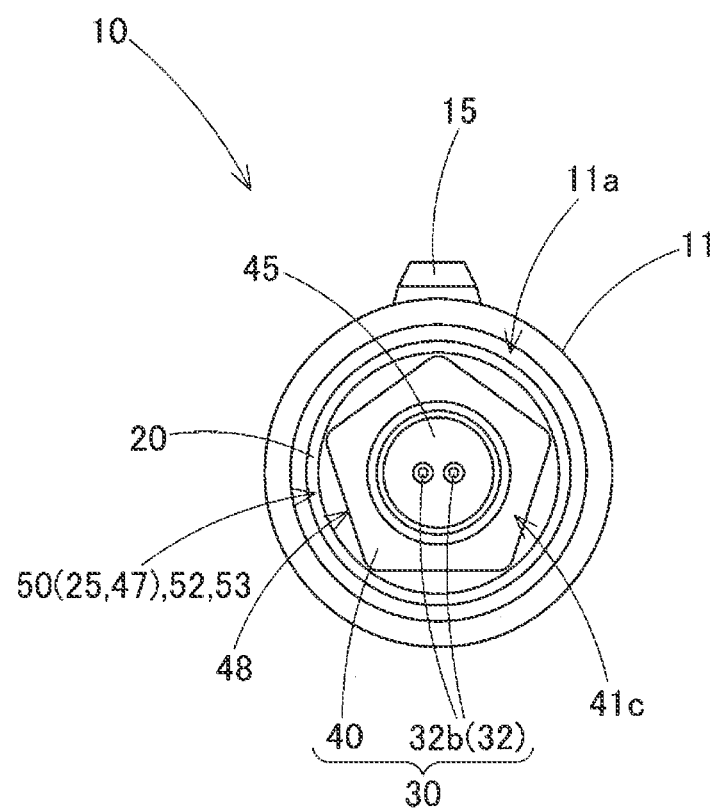
FIG. 2 is a schematic side view of the hybrid inflator according to the first embodiment.
Figure 3A:
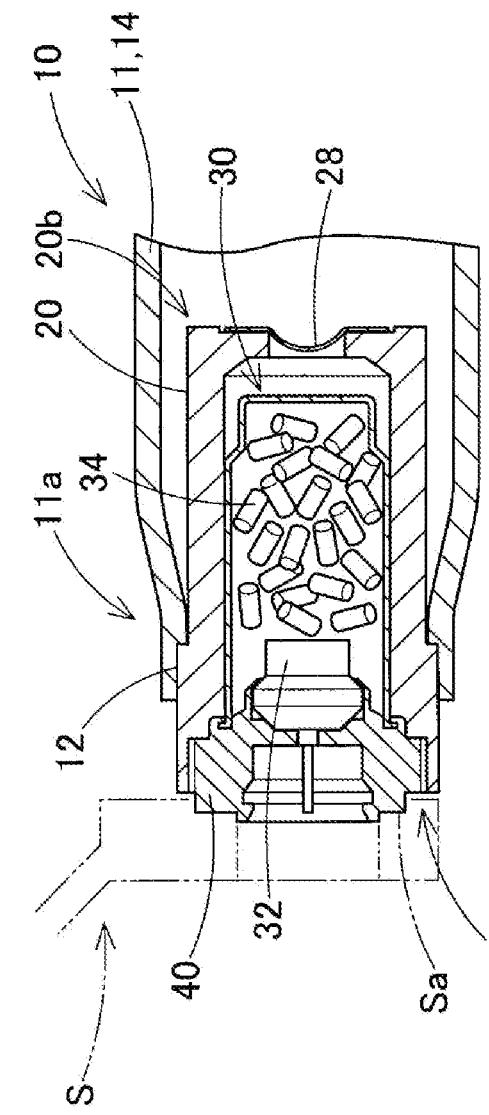
FIGS. 3A and 3B are schematic enlarged partial longitudinal sectional views of the hybrid inflator according to the first embodiment.
Figure 3B:
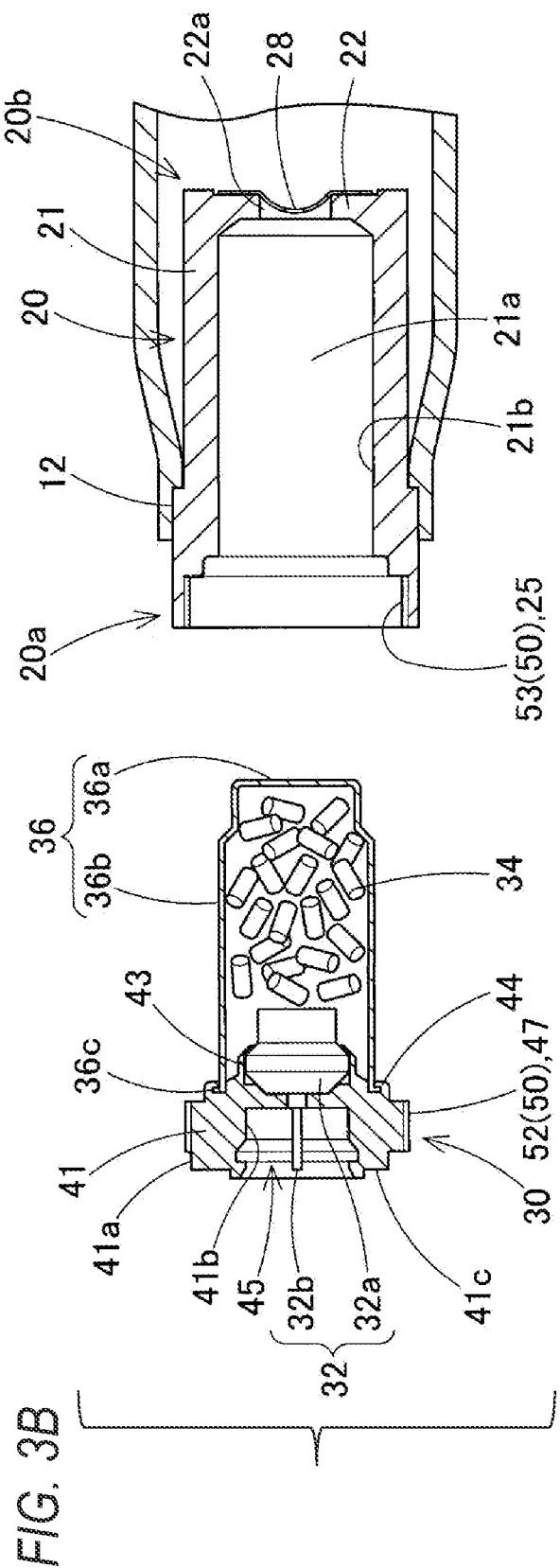
Figure 4:
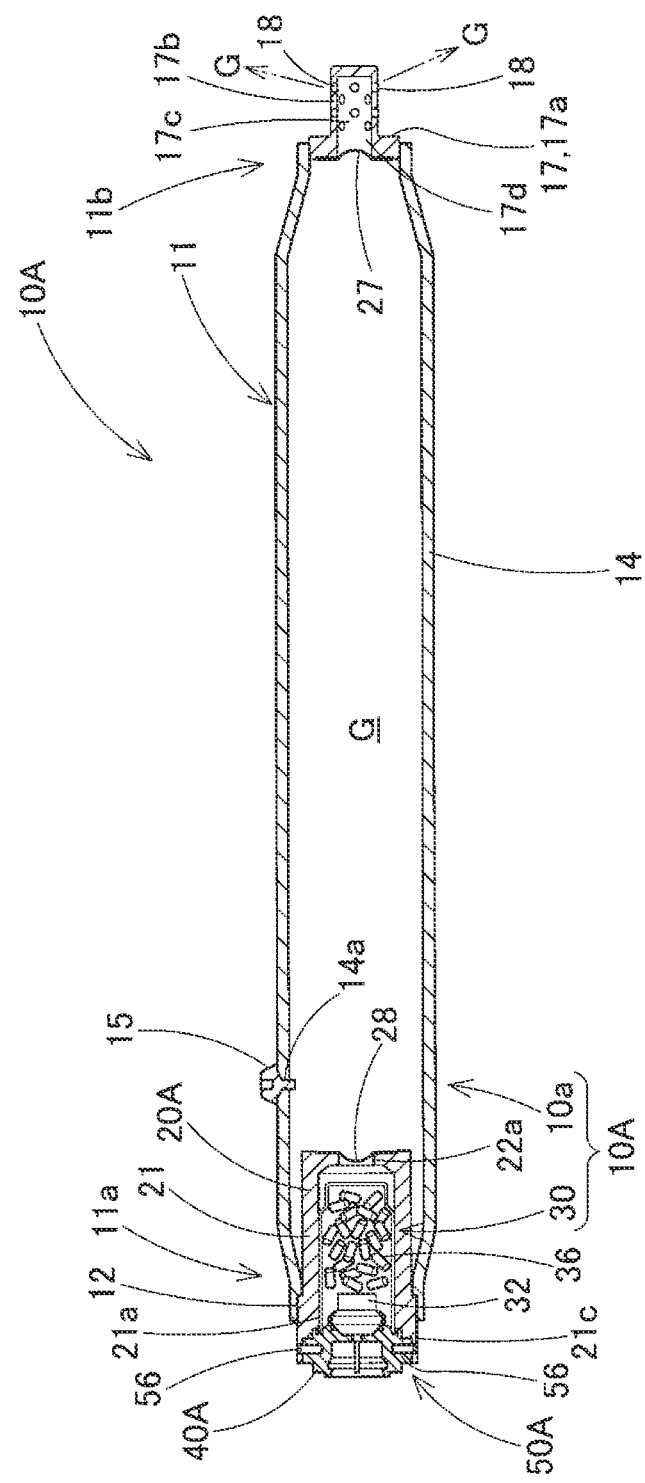
FIG. 4 is a schematic longitudinal sectional view of a hybrid inflator according to a second embodiment.
Figure 5:
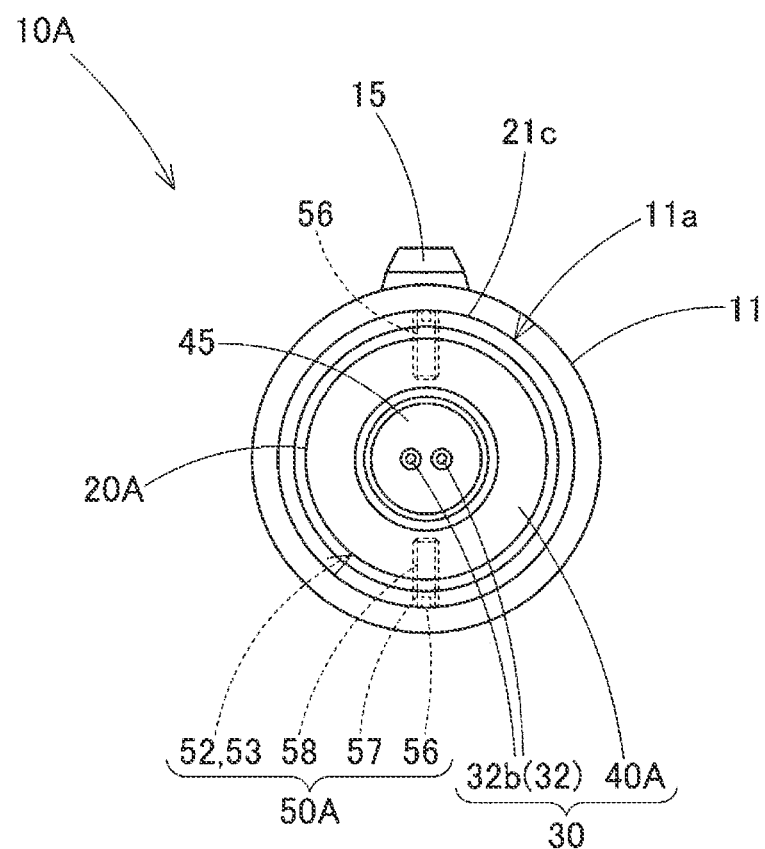
FIG. 5 is a schematic side view of the hybrid inflator according to the second embodiment.
Figure 6A:
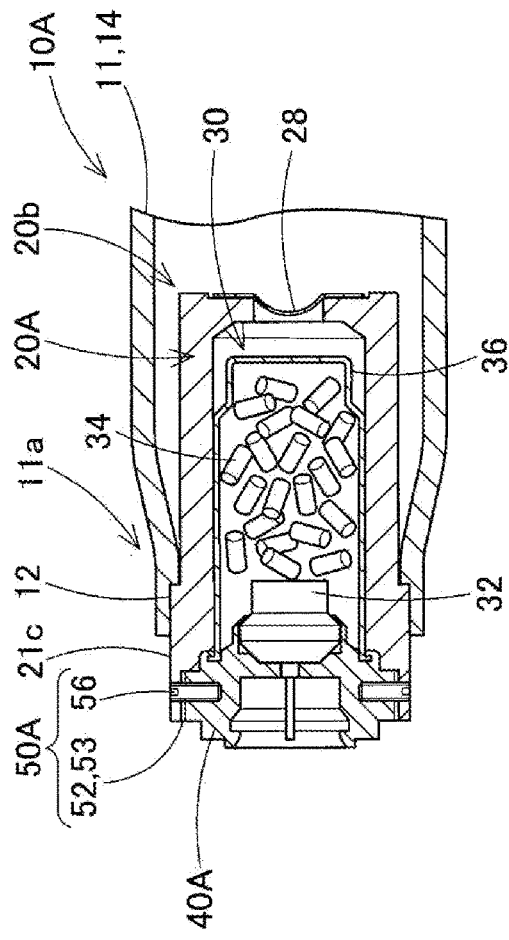
FIGS. 6A and 6B are schematic enlarged partial longitudinal sectional views of the hybrid inflator according to the second embodiment.
Figure 6B:
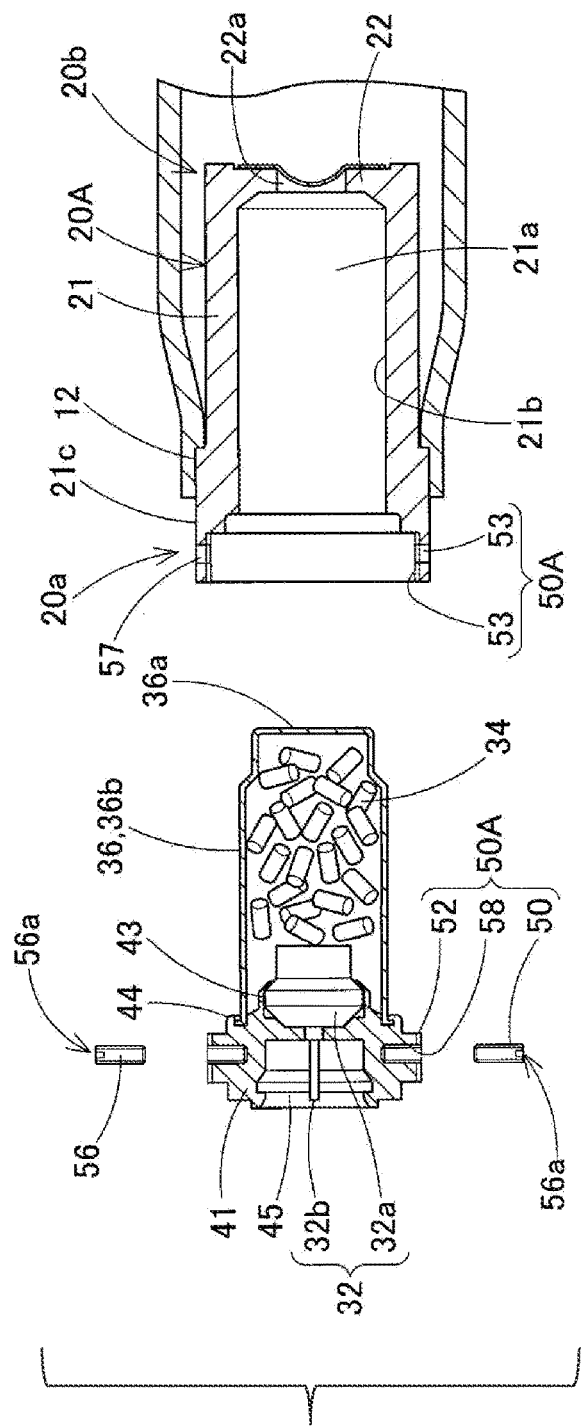
Figure 7:
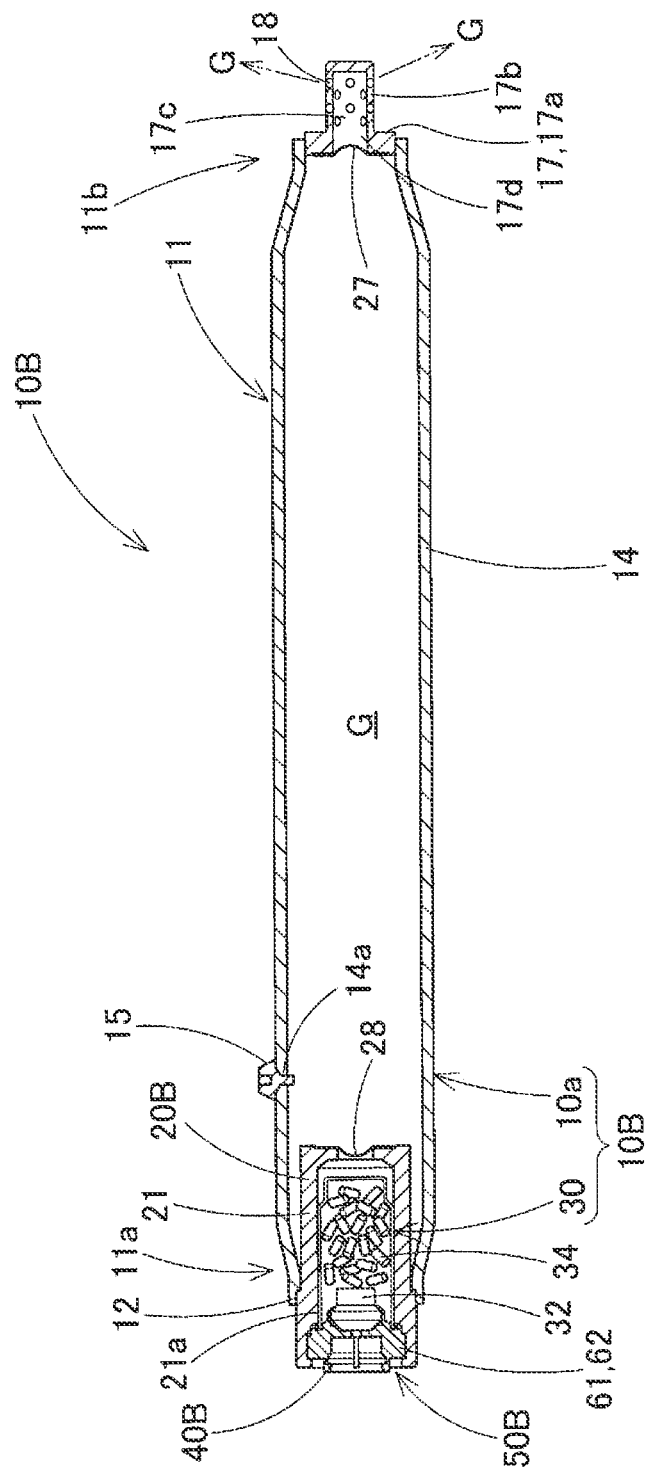
FIG. 7 is a schematic longitudinal sectional view of a hybrid inflator according to a third embodiment.

An outer shape of the holder 40 on the bottom surface 41c side of the tubular portion 41 is formed such that the holder 40 cannot be rotationally operated unless a dedicated tool S having a fitting opening portion Sa into which an assembling operation portion 48 is fitted is used, as the assembling operation portion 48 having a pentagonal prism shape (see FIGS. 2 to 3B).

In the inflator 10 according to the first embodiment, at the time of assembly, the gas discharge port portion 17 to which the burst disk 27 is attached is welded to the main body portion 14 on the front end portion 11b side of the bottle 11, and the housing 20 to which the burst disk 28 is attached is welded to the bottom portion 11a side of the bottle 11, thereby assembling the housing 20 to the bottle 11. Then, the pressurized gas G is filled from the filling opening 14a, and the filling opening 14a is closed by the plug 15 and welded. As a result, the housing 20 is connected to the bottle 11, and the inflator main body 10a filled with the pressurized gas G can be formed.

Thereafter, the squib 32 is assembled to the holder 40, and the assembled gas generator 30 in which the cup 36 filled with the gas generating agent 34 is coupled to the holder 40 is assembled to the housing 20 of the inflator main body 10a by assembling the assembling portions 47 and 25 to each other, and whereby the inflator 10 can be manufactured. The manufactured inflator 10 can be mounted on a vehicle by coupling the gas discharge port portion 17 side to a connection port portion of a curtain airbag (not shown), attaching the inflator 10 to a body of the vehicle using a predetermined bracket, and inserting a connector (not shown) for operation into the connector recessed portion 45.

Further, when the inflator 10 is activated, the combustion gas of the gas generating agent 34 is generated by the ignition of the squib 32 in the gas generator 30, so that the two burst disks 27 and 28 are broken (ruptured), and the pressurized gas G is discharged from the discharge port 18 of the gas discharge port portion 17, thereby inflating the airbag.

When the inflator 10 is in an inoperative state with the disposal of the vehicle, the inflator 10 is removed from the vehicle, and the gas generator 30 is removed so as to reuse the inflator main body 10a including the pressurized gas G, the bottle 11, and the housing 20 in the inflator 10. At this time, in an assembly structure 50 of the gas generator 30 and the housing 20 according to the first embodiment, the gas generator 30 is detachably assembled to the housing 20. The assembly structure 50 according to the first embodiment is a screw structure, and the gas generator 30 is assembled to the housing 20 by fastening the male screw portion 52 of the gas generator 30 to the female screw portion 53 of the housing 20. Therefore, as shown in FIGS. 3A and 3B, the gas generator 30 before replacement can be removed from the housing 20 by fitting the fitting opening portion Sa of the dedicated tool S to the assembling operation portion 48 having a pentagonal prism shape and turning the assembling operation portion 48. Then, when the male screw portion 52 on the outer peripheral surface 41a side of the holder 40 in a new gas generator 30 is screwed into the female screw portion 53 on the inner peripheral surface 21b side of the housing recessed portion 21a in the housing 20 by using the dedicated tool S, the new gas generator 30 can be assembled to the inflator main body 10a, and the inflator 10 reusing the inflator main body 10a can be easily manufactured.

As described above, in the hybrid inflator 10 according to the first embodiment, the gas generator 30 is assembled to the housing recessed portion 21a of the housing 20 as the detachable assembly structure 50, and at the time of reuse, the already attached gas generator 30 can be removed, and a new gas generator 30 can be easily assembled to the housing recessed portion 21a.

Therefore, in the hybrid inflator 10 according to the first embodiment, the gas generator 30 can be easily replaced, and the pressurized gas G, the bottle 11, and the housing 20 can be reused.

In the hybrid inflator 10 according to the first embodiment, the assembly structure 50 is the screw structure in which the holder 40 of the gas generator 30 and the housing recessed portion 21a of the housing 20 are respectively provided with the screw portions 52 and 53 corresponding to each other.

Therefore, in the hybrid inflator 10 according to the first embodiment, when the holder 40 of the gas generator 30 is turned and the screw portion (male screw portion) 52 of the holder 40 is removed from the screw portion (female screw portion) 53 of the housing recessed portion 21a of the housing 20, the gas generator 30 can be removed from the housing 20, and when the screw portion (male screw portion) 52 of the holder 40 of the new gas generator 30 is screwed into the screw portion (female screw portion) 53 of the housing recessed portion 21a of the housing 20, the new gas generator 30 can be assembled to the housing 20 to be reused, and the inflator 10 in which the bottle 11 in which the pressurized gas G is sealed and the housing 20 are reused can be easily formed.

In the hybrid inflator 10 according to the first embodiment, the holder 40 to be assembled to the housing 20 is formed by disposing the assembling operation portion 48 corresponding to the dedicated tool S so that the dedicated tool S is used as a tool for an assembly operation. In the case of the first embodiment, since the outer shape of the assembling operation portion 48 on the bottom surface 41c side of the tubular portion 41 of the holder 40 is a pentagonal prism shape, a spanner or the like cannot be used, and the holder 40 can be attached and detached by using the dedicated tool S having the fitting opening portion Sa that is fittable to the assembling operation portion 48 having a pentagonal prism shape.

Therefore, in the first embodiment, since the holder 40 cannot be attached and detached unless the dedicated tool S is used, it is possible to prevent an outsider from removing the gas generator 30 from the housing 20.

In the illustrated example, the assembling operation portion 48 corresponding to the dedicated tool S is illustrated as having a pentagonal prism shape, but the assembling operation portion 48 is not limited to the pentagonal prism shape as long as the assembling operation portion 48 corresponds to a predetermined dedicated tool, may have a triangular prism shape or the like, and may have a shape having a concave portion or a concave-convex portion corresponding to a dedicated tool instead of a prism shape.

When the gas generator 30 is screwed into and assembled to the housing 20, a hybrid inflator 10A according to a second embodiment shown in FIGS. 4 to 6B may be configured so as to prevent the gas generator 30 from being removed by an outsider.

In the hybrid inflator 10A, an assembly structure 50A of the gas generator 30 and the housing 20A is a screw structure in which a holder 40A of the gas generator 30 and the housing recessed portion 21a of a housing 20A are respectively provided with the screw portions 52 and 53 corresponding to each other, similarly to the first embodiment. Further, in the hybrid inflator 10A, a through hole 57 is formed in the housing 20A, and a screw hole 58 is formed in the holder 40A at a position corresponding to the through hole 57 (see FIGS. 6A and 6B). A fixing screw 56 is inserted into the through hole 57 and the screw hole 58 from an outer peripheral surface 21c side of the housing 20A. In the second embodiment, the fixing screw 56 is a set screw, and the fixing screw 56 inserted from the outer peripheral surface 21c side of the housing 20A passes through the through hole 57 and is screwed into the screw hole 58.

In the assembly structure according to the second embodiment, the through hole 57 and the screw hole 58 are formed on both sides of the substantially cylindrical gas generator 30 in a radial direction orthogonal to an axial direction of the holder 40A and the housing 20A. Two fixing screws 56 are used to be inserted into the through holes 57 and the screw holes 58 on both sides. In addition, in the case of the second embodiment, the fixing screw 56 formed of a set screw is provided with an operation portion 56a having a cross-shaped hole on an end surface side. The number of the fixing screws 56 is not limited to two, and one fixing screw 56 may be used.

In the hybrid inflator 10A, during removal of the gas generator 30, the fixing screw 56 is turned by using a jig corresponding to the operation portion 56a, the fixing screw 56 is pulled out from the screw hole 58 or the through hole 57, and the holder 40A is further turned to remove the screw portion (male screw portion) 52 of the holder 40A from the screw portion (female screw portion) 53 of the housing recessed portion 21a of the housing 20A, so that the gas generator 30 can be removed from the housing 20A. Further, the screw portion (male screw portion) 52 of the holder 40A of anew gas generator 30 is screwed into the screw portion (female screw portion) 53 of the housing recessed portion 21a of the housing 20A, and further, the fixing screw 56 is turned by using a jig corresponding to the operation portion 56a and screwed into the screw hole 58 through the through hole 57, so that the new gas generator 30 can be assembled to the housing 20A to be reused, and the hybrid inflator 10A in which the bottle 11 in which the pressurized gas G is sealed and the housing 20A are reused can be easily formed.

In the hybrid inflator 10A, in addition to the same operation and effect as those of the first embodiment, the fixing screw 56 makes it difficult for the gas generator 30 to come off from the housing 20A, so that an assembly strength of the gas generator 30 with respect to the housing 20A can be improved. In addition, since the fixing screw 56 is formed of a set screw, it is difficult to visually observe the fixing screw 56, and it is possible to prevent an outsider from removing the gas generator 30 from the housing.

If this point is not taken into consideration, a normal screw such as a countersunk screw may be used as the fixing screw instead of the set screw.

In the first and second embodiments, the assembly structures 50 and 50A of the gas generator 30 and the housings 20 and 20A is exemplified as a screw structure, but an assembly structure 50B may be a bayonet structure as in a hybrid inflator 10B shown in FIGS. 7 to 9B.

That is, the assembly structure 50B is configured as a bayonet structure including claw portions 61 provided at a holder 40B of the gas generator 30 and groove portions 62 provided in the housing recessed portion 21a of the housing 20B and into which the claw portions 61 are inserted and locked. The claw portions 61 are disposed at two positions on the outer peripheral surface 41a in the diameter direction orthogonal to an axial center of the substantially cylindrical holder 40B, and protrude from the outer peripheral surface 41a as a curved plate-like shape. In addition, each of the groove portions 62 includes an insertion groove 63 in which an insertion opening 62a into which the claw portion 61 can be inserted is opened on the bottom portion 20a side of the housing recessed portion 21a of the housing 20B, that extends along the axial direction of the housing 20B, and into which the claw portion 61 can be inserted, and a locking groove 64 that extends in a peripheral direction of the housing 20B from a front end 63a of the insertion groove 63, and can lock the claw portion 61 to an edge 64b on the bottom portion 20a side. A receiving surface 21d that receives an outer peripheral edge 42a of the ceiling portion 42 of the holder 40B is formed on the front end 63a side of the insertion groove 63 of the housing recessed portion 21a so that the claw portion 61 does not enter further in an insertion direction. Further, the locking groove 64 has such a dimension that the claw portion 61 is fitted so as to restrict a movement of the holder 40B along the axial direction of the housing 20B and so as to be movable along the peripheral direction of the housing 20B, and the claw portion 61 has such a dimension that when the claw portion 61 is rotated by 90° from a disposition position of the insertion groove 63 and disposed in a vicinity of a front end 64a of the locking groove 64, fitting strength is increased and the claw portion 61 is fitted to the locking groove 64 to such an extent that the claw portion 61 does not rotate reversely.

Figure 8A:
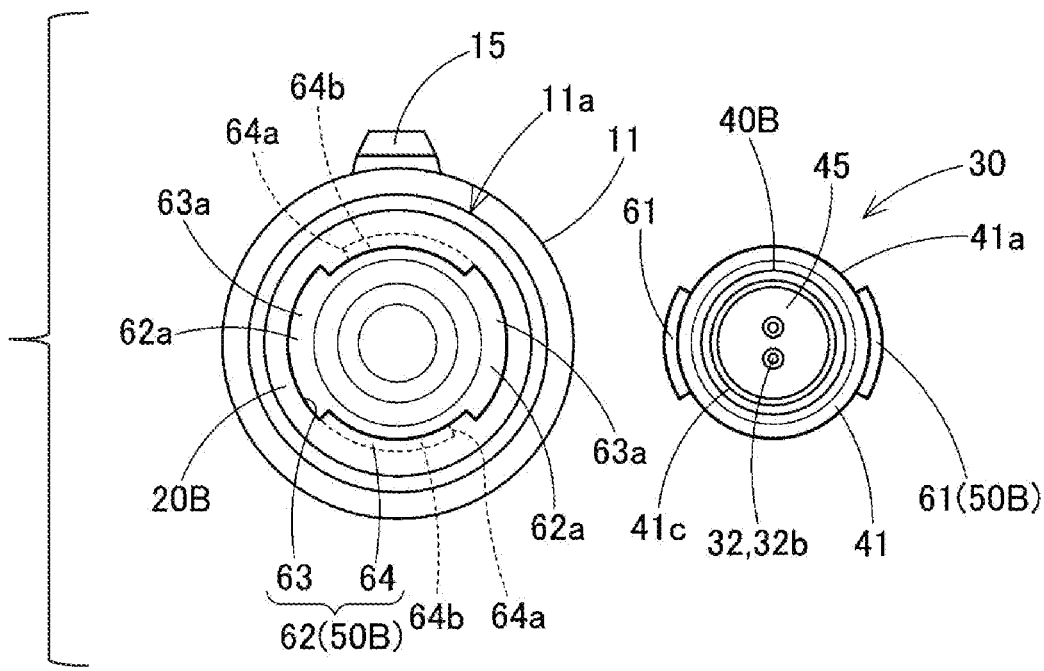
FIGS. 8A to 8C are schematic side views of the hybrid inflator according to the third embodiment.
Figure 8B:
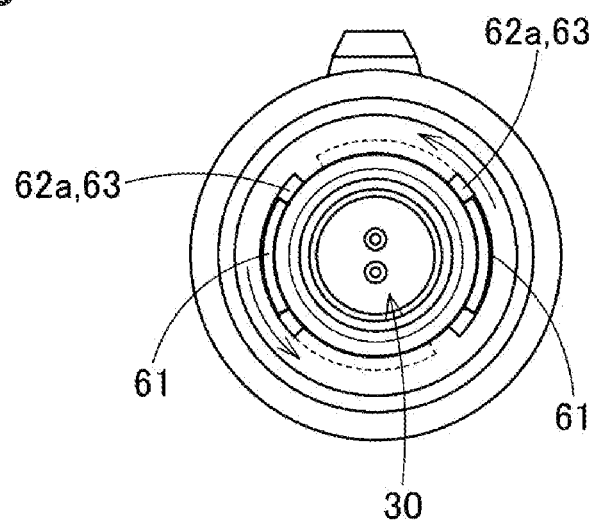
Figure 8C:
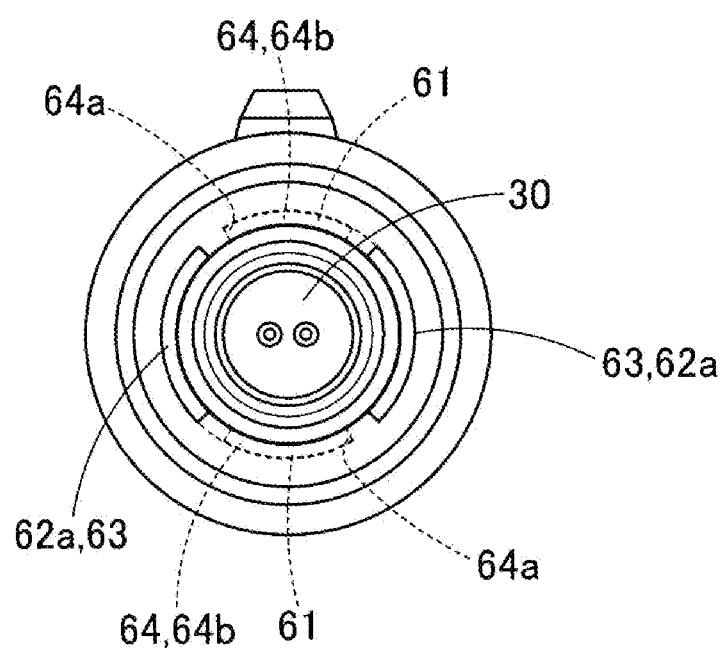
Figure 9A:
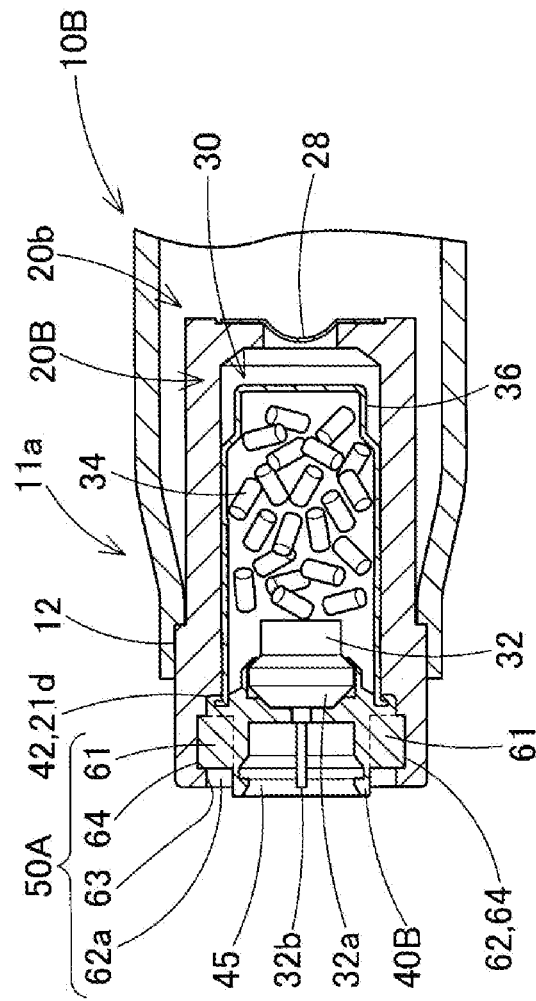
FIGS. 9A and 9B are schematic enlarged partial longitudinal sectional views of the hybrid inflator according to the third embodiment.
Figure 9B:
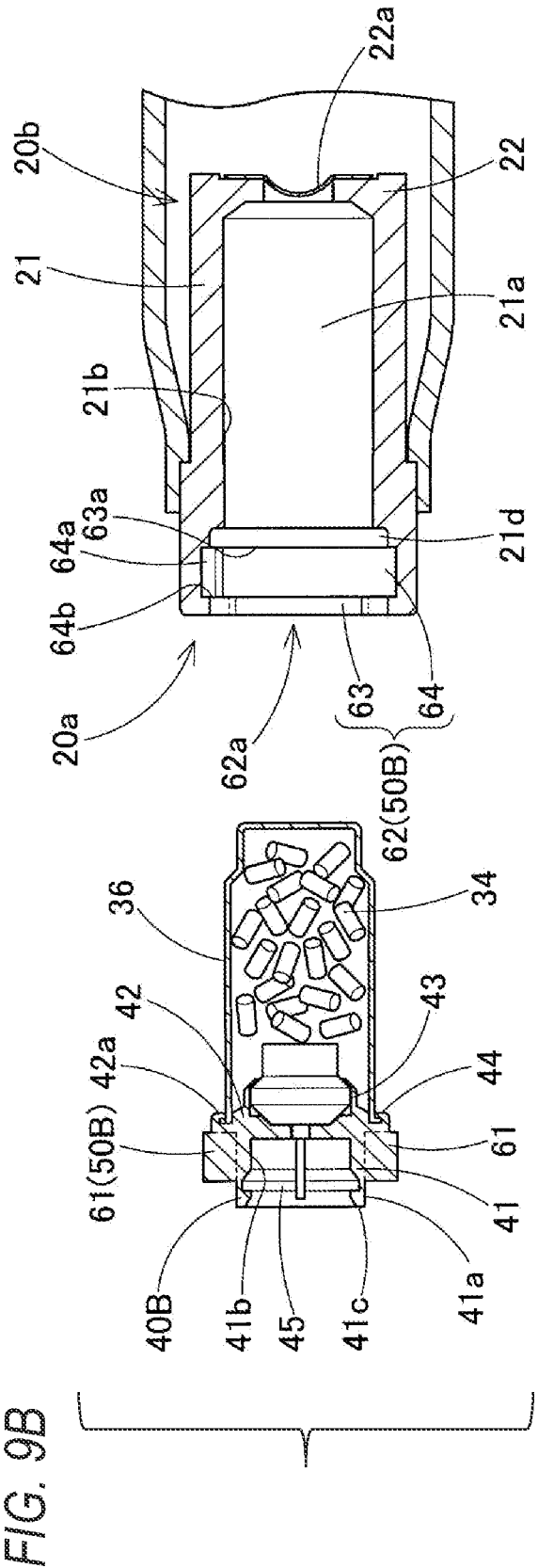
Figure 10:
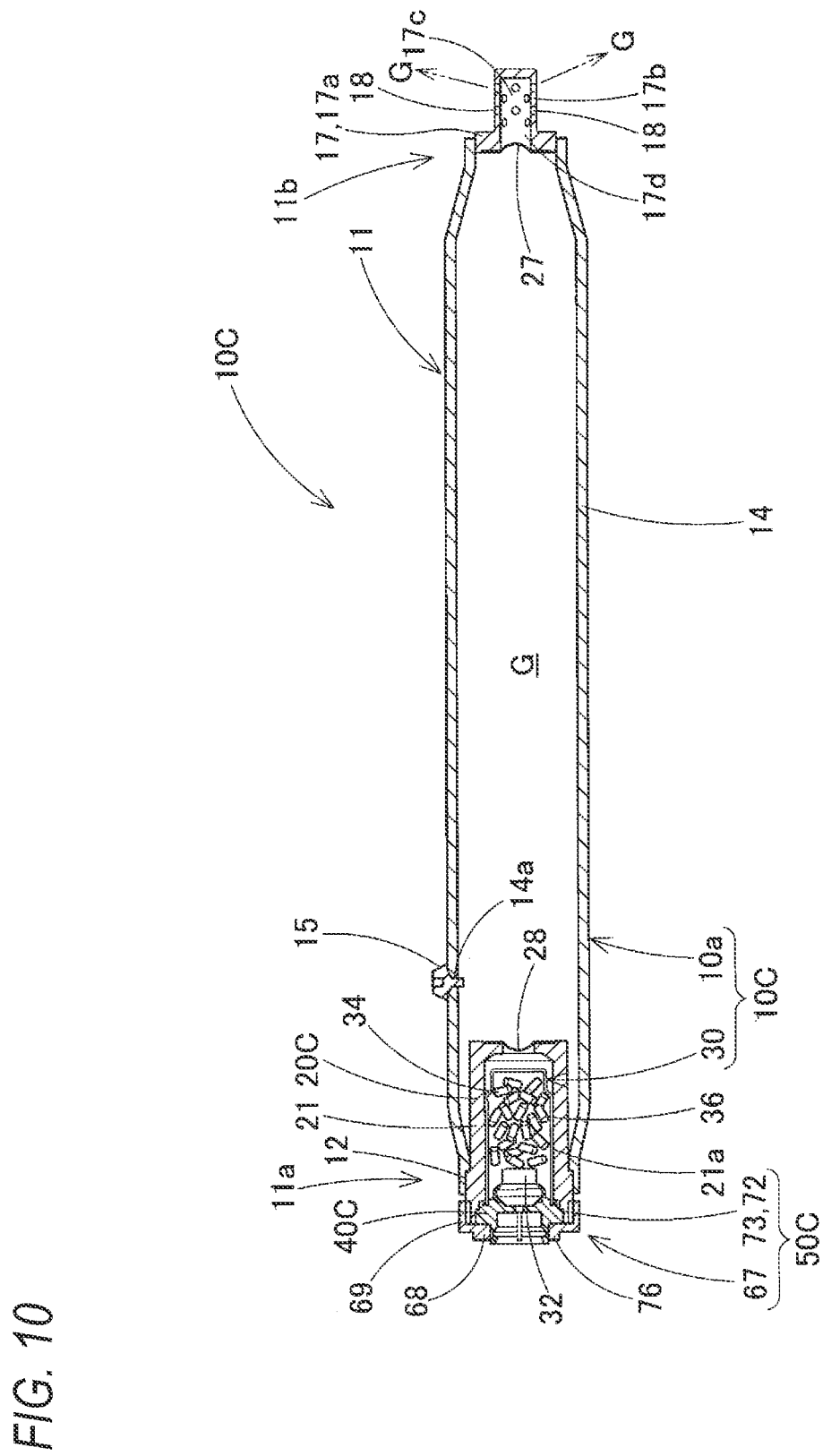
FIG. 10 is a schematic longitudinal sectional view of a hybrid inflator according to a fourth embodiment.
Figure 11:
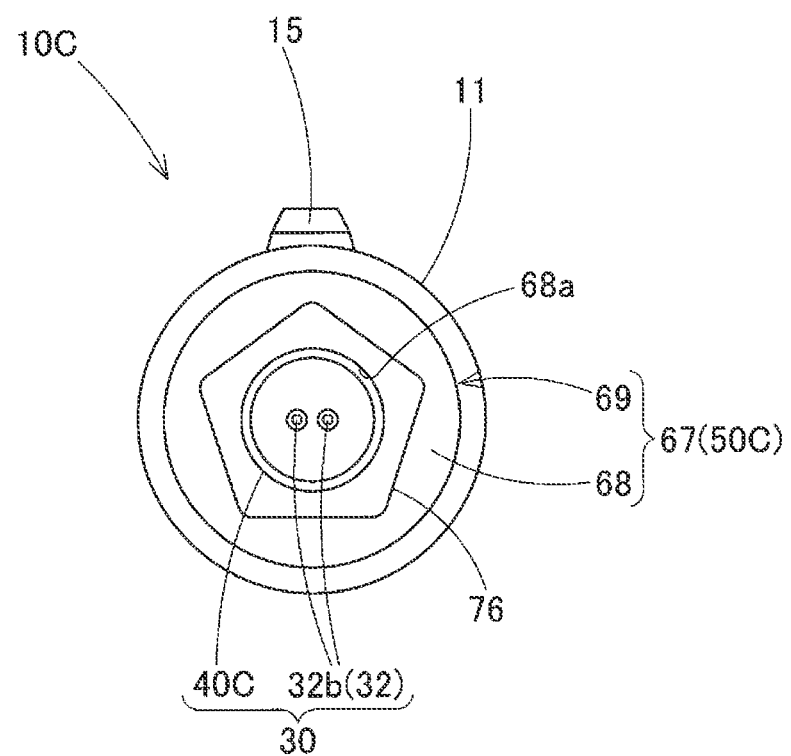
FIG. 11 is a schematic side view of the hybrid inflator according to the fourth embodiment.
Figure 12A:
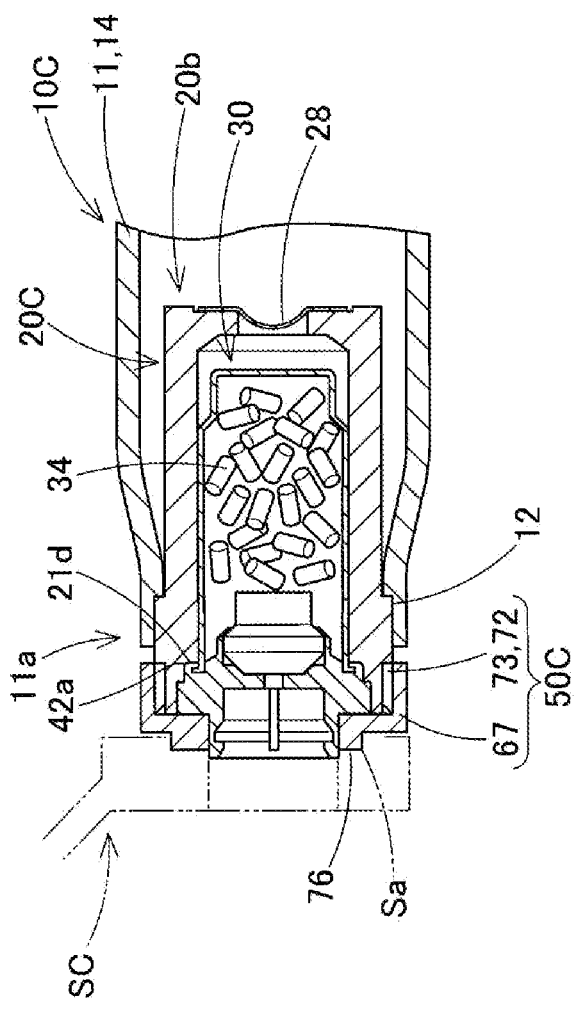
FIGS. 12A and 12B are schematic enlarged partial longitudinal sectional views of the hybrid inflator according to the fourth embodiment.
Figure 12B:
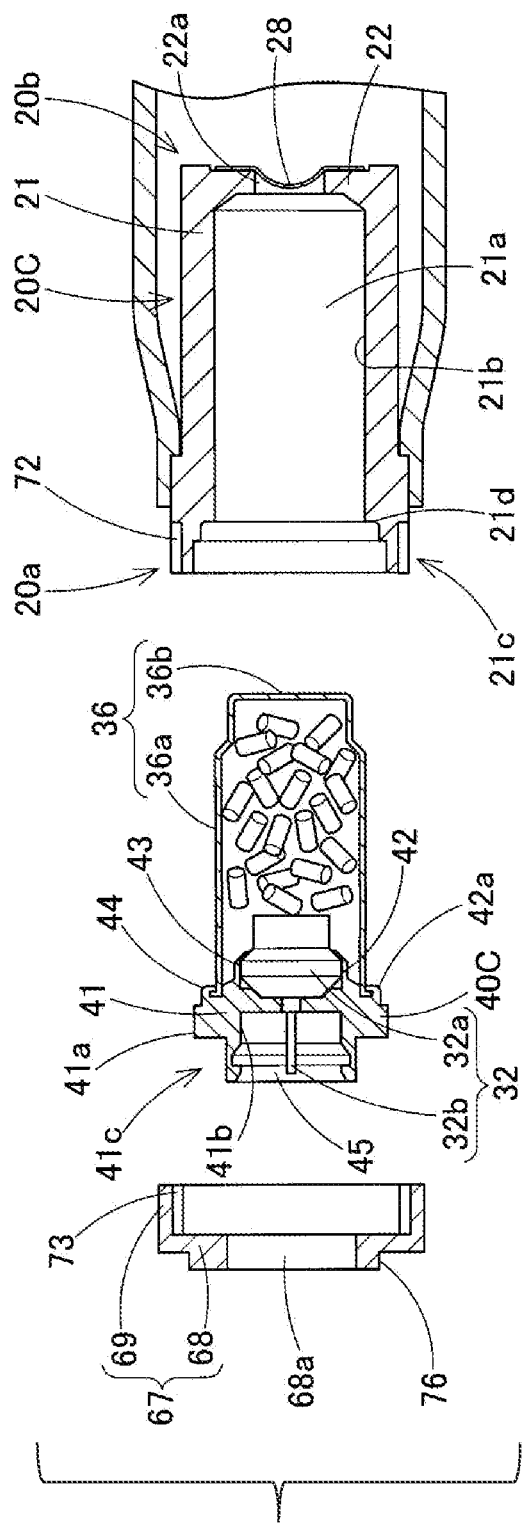
Figure 13:
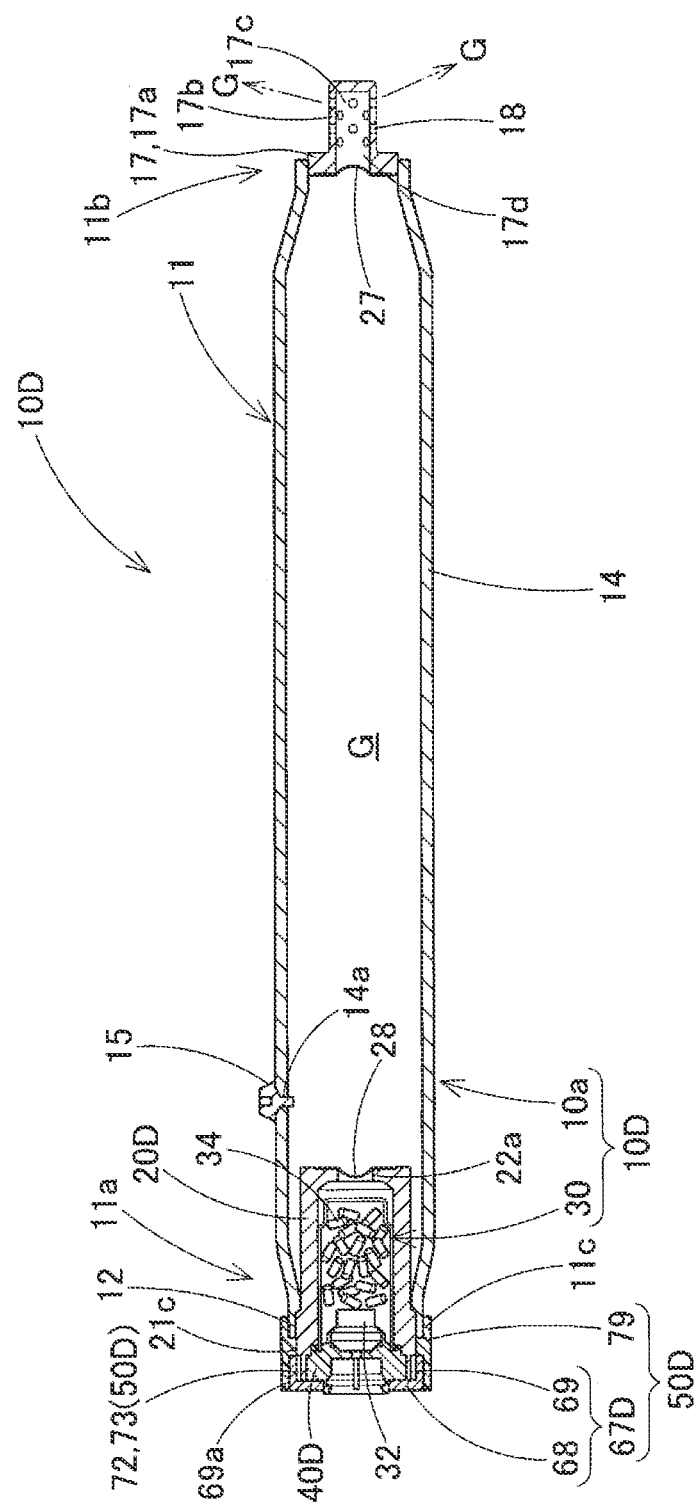
FIG. 13 is a schematic longitudinal sectional view of a hybrid inflator according to a fifth embodiment.
Figure 14:
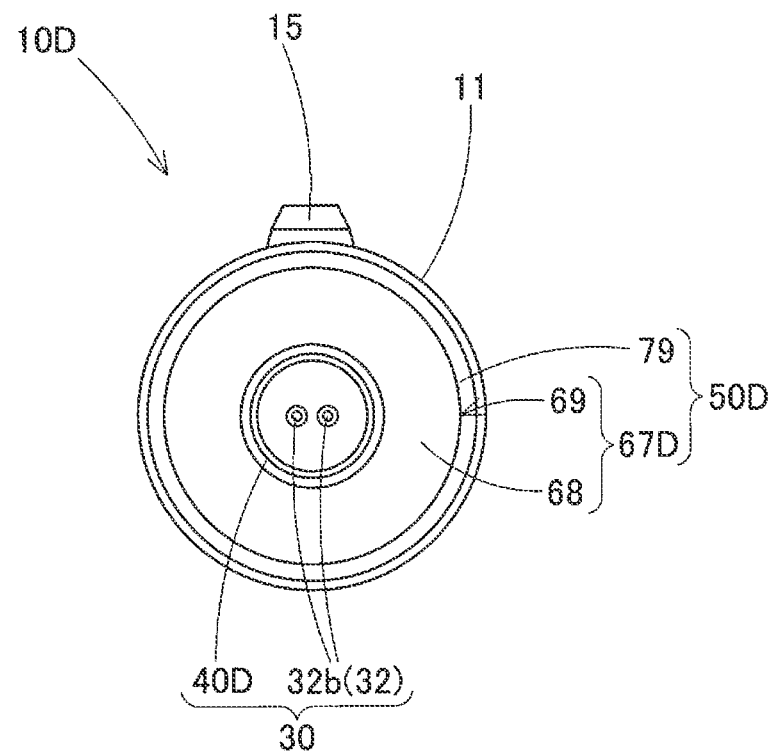
FIG. 14 is a schematic side view of the hybrid inflator according to the fifth embodiment.
Figure 15A:
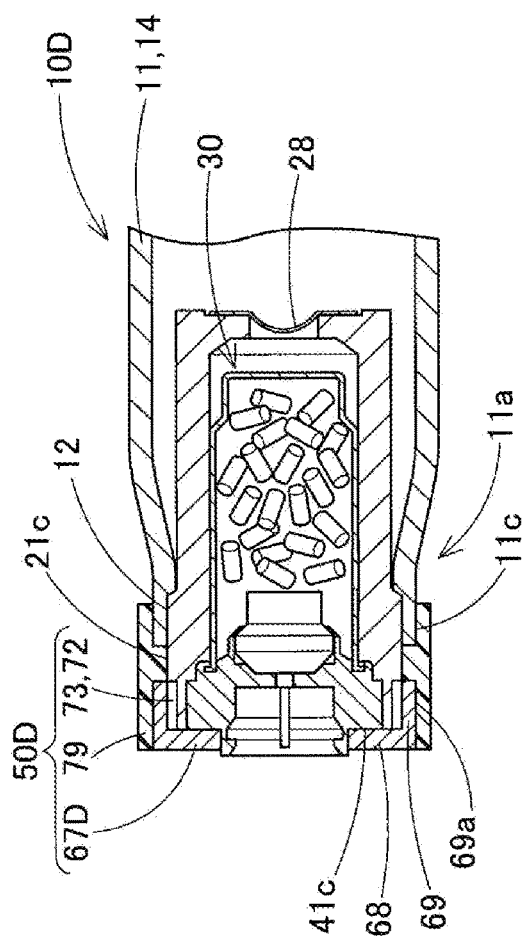
FIGS. 15A and 15B are schematic enlarged partial longitudinal sectional views of the hybrid inflator according to the fifth embodiment.
Figure 15B:
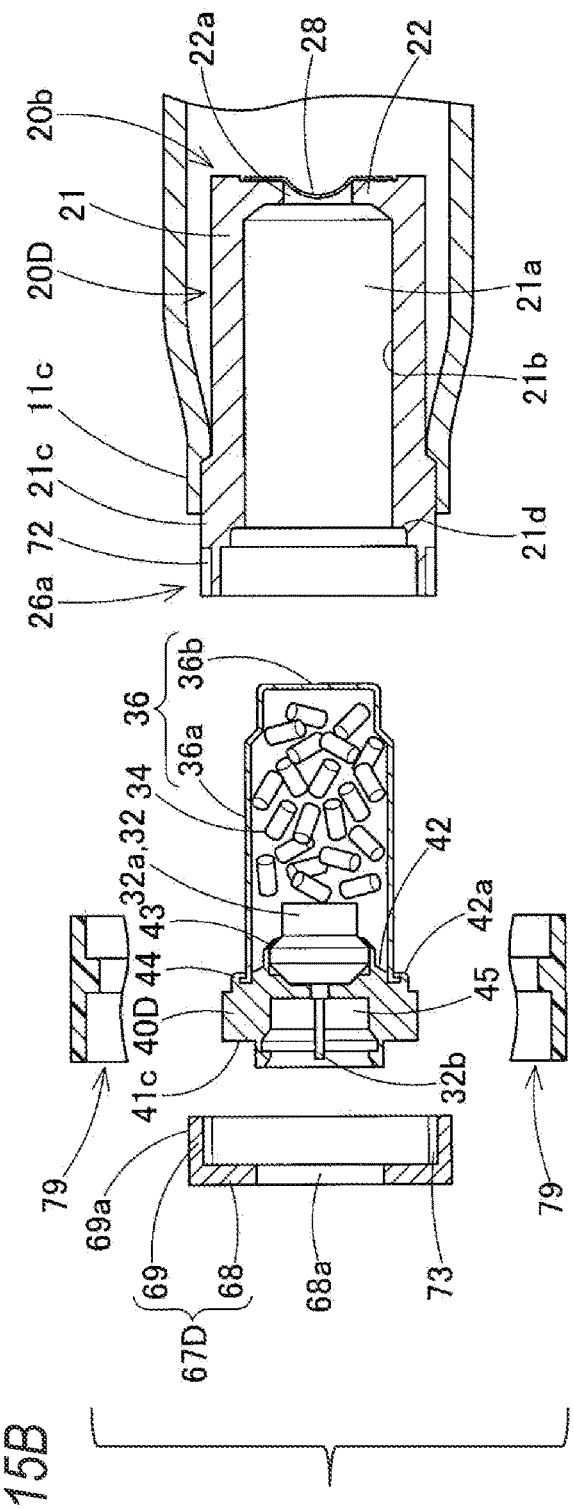
Figure 16:
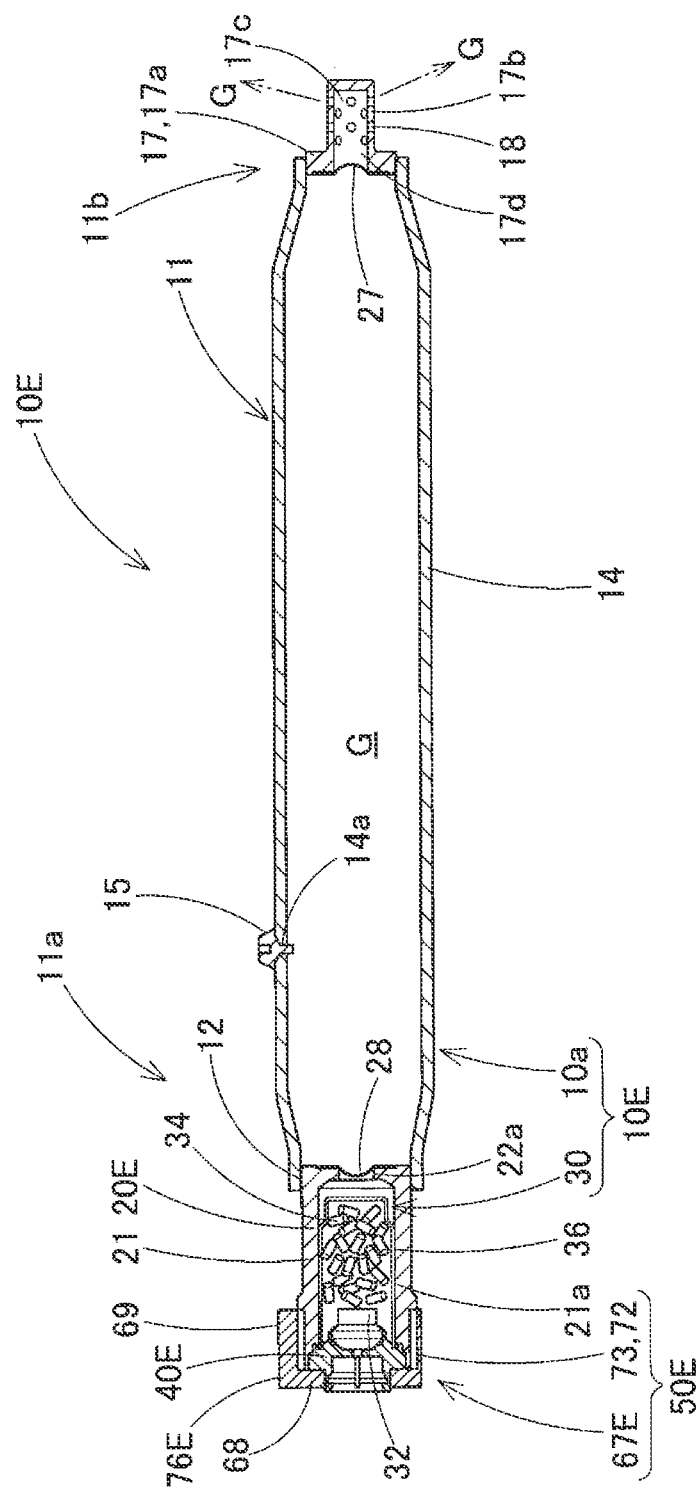
FIG. 16 is a schematic longitudinal sectional view of a hybrid inflator according to a sixth embodiment.
Figure 17:
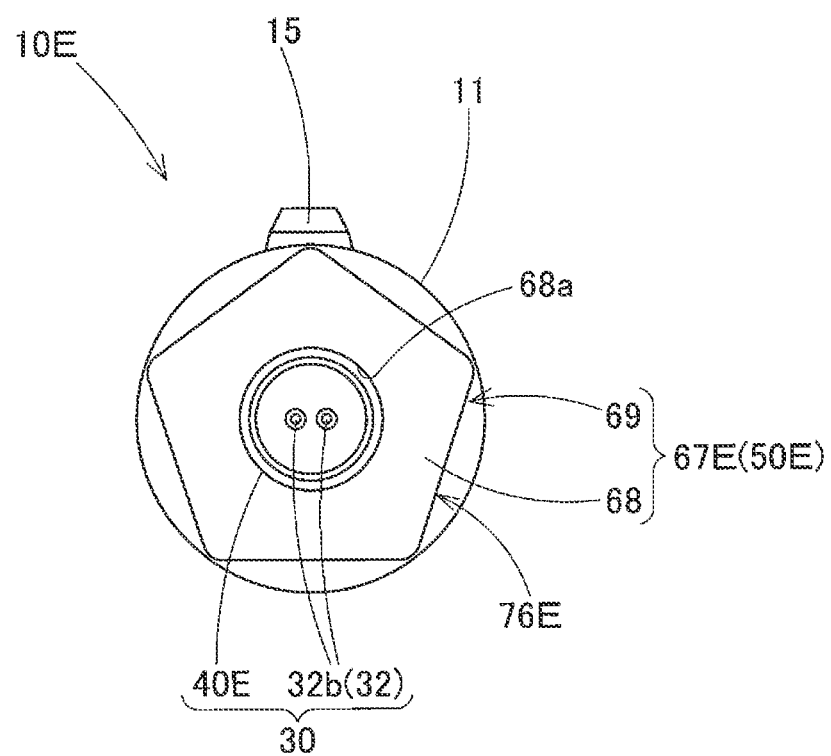
FIG. 17 is a schematic side view of the hybrid inflator according to the sixth embodiment.
Figure 18A:
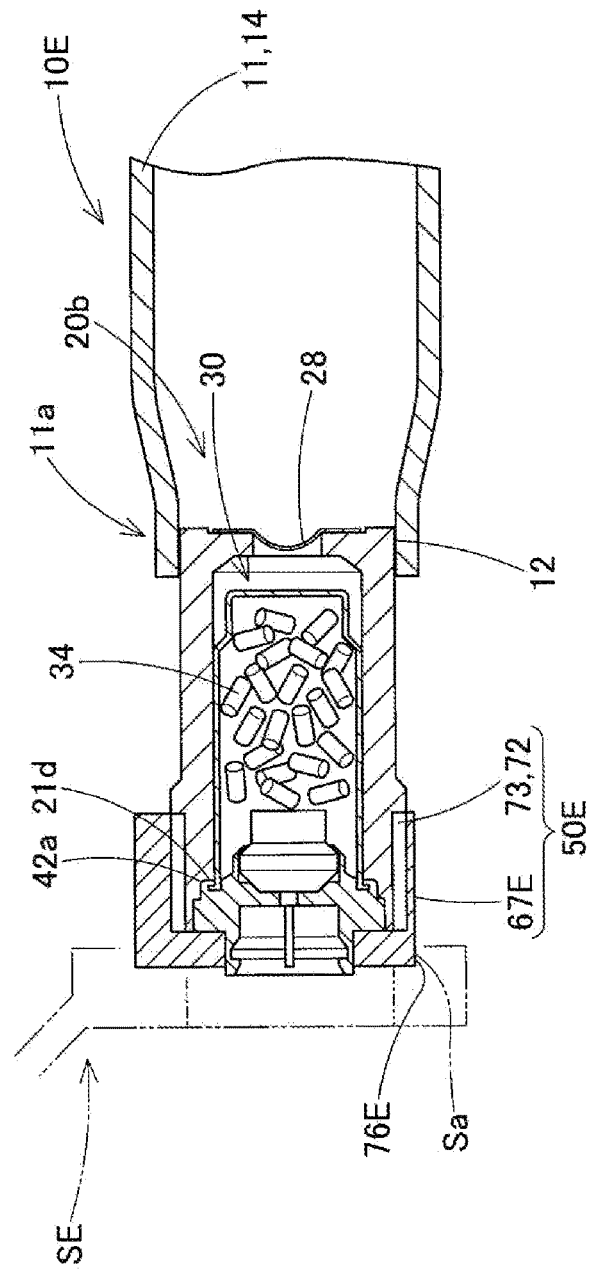
FIGS. 18A and 18B are schematic enlarged partial longitudinal sectional views of the hybrid inflator according to the sixth embodiment.
Figure 18B:
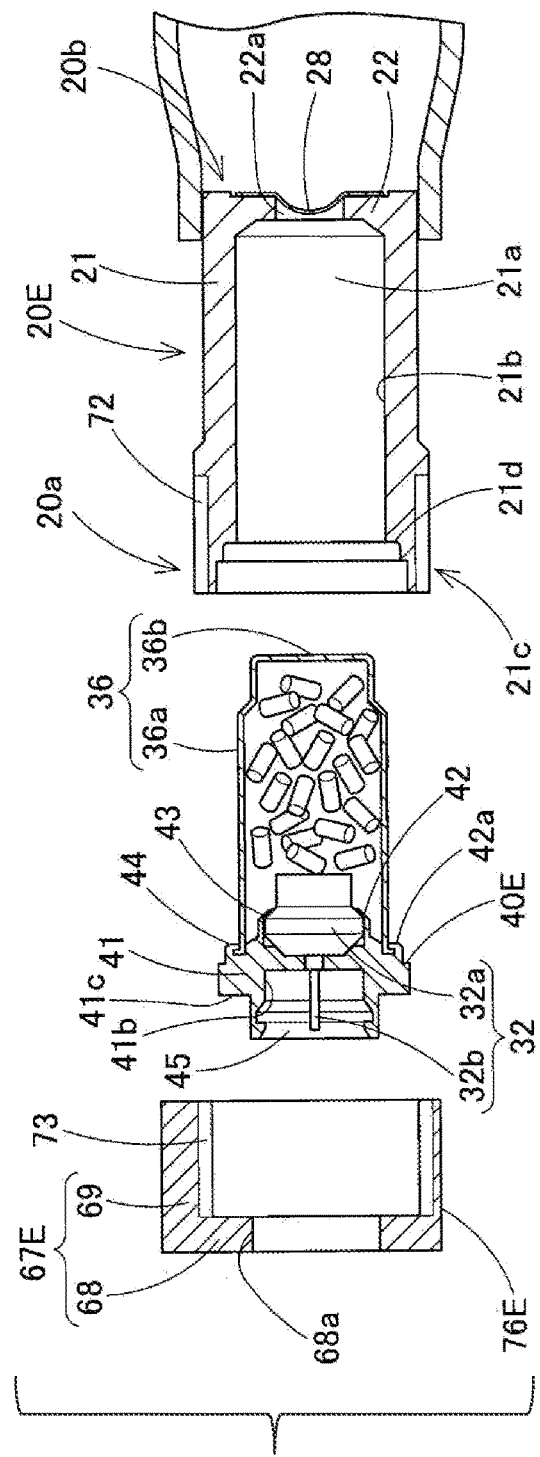

In the hybrid inflator 10B, during the removal of the gas generator 30 from the housing 20B, the holder 40B of the gas generator 30 is turned to move the claw portion 61 of the holder 40b from a locking position on the front end 64a side of the locking groove 64 of the groove portion 62 to a position of the insertion groove 63 where the claw portion 61 can be pulled out (in FIG. 8C, the claw portion 61 is rotated in a counterclockwise direction), and the gas generator 30 is pulled out, so that the gas generator 30 can be removed from the housing 20B. Further, the claw portion 61 of the holder 40B of a new gas generator 30 is inserted from the insertion opening 62a at an insertion position in the groove portion 62 of the housing 20B (see FIGS. 8A and 8B), the holder 40B is brought into contact with the receiving surface 21d, and then the holder 40B is rotated to rotate the claw portion 61 to the locking position in the vicinity of the front end 64a of the locking groove 64 (rotated by 90° in a clockwise direction as shown in FIGS. 8B and 8C), so that the new gas generator 30 can be assembled to the housing 20B to be reused, and the hybrid inflator 10B in which the bottle 11 in which the pressurized gas G is sealed and the housing 20B are reused can be easily formed.

In the third embodiment, as in the first embodiment, the assembling operation portion 48 that can be rotated using the dedicated tool S may be provided on the bottom surface 41c side of the holder 40B, or the fixing screw 62 formed of the set screw of the second embodiment may be provided.

The assembly structure of the gas generator and the housing may be configured as in a hybrid inflator 10C according to a fourth embodiment shown in FIGS. 10 to 12B. An assembly structure 50C of the hybrid inflator 10C has a fitting shape in which the gas generator 30 is fittable to the housing recessed portion 21a of the housing 20C, and includes a coming-off preventing member 67 that prevents the gas generator 30 fitted to the housing recessed portion 21a from coming off the housing recessed portion 21a. The housing recessed portion 21a of the housing 20C includes the receiving surface 21d that receives the outer peripheral edge 42a of the ceiling portion 42 of the holder 40C when the gas generator 30 is housed, and has a shape to which the holder 40C is fittable.

The coming-off preventing member 67 is made of a metal such as steel, and includes a bottom wall portion 68 that comes into contact with the bottom surface 41c side of the gas generator 30 at the time of fitting to the housing recessed portion 21a, and a tubular portion 69 that extends from an outer peripheral edge of the bottom wall portion 68 and has an inner peripheral surface provided with a female screw portion 73 that is screwed into a male screw portion 72 provided on an outer peripheral side of the housing 20C. The bottom wall portion 68 includes an insertion hole 68a through which the connector recessed portion 45 of the holder 40C is opened. Further, an assembling operation portion 76 having a pentagonal prism shape protrudes from a peripheral edge of the insertion hole 68a of the bottom wall portion 68, and the coming-off preventing member 67 is rotatable by using a dedicated tool SC (see FIGS. 12A and 12B) having the fitting opening portion Sa that is fittable to the assembling operation portion 76.

In the hybrid inflator 10C according to the fourth embodiment, when the fitting opening portion Sa of the dedicated tool SC is fitted to the assembling operation portion 76 of the coming-off preventing member 67, the dedicated tool SC is operated, and the coming-off preventing member 67 is turned and removed from the housing 20C, the bottom wall portion 68 of the coming-off preventing member 67 which has been in contact with the bottom surface 41c side of the gas generator 30 is removed, and the gas generator 30 can be taken out from the housing 20C. Further, while a new gas generator 30 is fitted into the housing recessed portion 21a of the housing 20C, and the bottom wall portion 68 of the coming-off preventing member 67 is brought into contact with the bottom surface 41c side of the new gas generator 30, the female screw portion 73 of the tubular portion 69 of the coming-off preventing member 67 is screwed into the male screw portion 72 on the outer peripheral surface 21c side of the housing 20C while fitting the fitting opening portion Sa of the dedicated tool SC to the assembling operation portion 76 and turning the dedicated tool SC, whereby the new gas generator 30 can be assembled to the housing 20C to be reused, and the hybrid inflator 10C in which the bottle 1I in which the pressurized gas G is sealed and the housing 20C are reused can be easily formed.

In the hybrid inflator 10C according to the fourth embodiment, the coming-off preventing member 67 can also be reused.

Also in the fourth embodiment, the coming-off preventing member 67 to be assembled to the housing 20C is formed by disposing the assembling operation portion 76 corresponding to the dedicated tool SC so that the dedicated tool SC is used as a tool for an assembly operation. In the assembling operation portion 76, an outer shape of a peripheral edge of the insertion hole 68a of the bottom wall portion 68 is a pentagonal prism shape, a spanner or the like cannot be used, and the coming-off preventing member 67 can be attached and detached by using the dedicated tool SC having the fitting opening portion Sa that is fittable to the assembling operation portion 76 having a pentagonal prism shape. Also in the fourth embodiment, since the coming-off preventing member 67 cannot be attached and detached unless the dedicated tool S is used, it is possible to prevent an outsider from removing the gas generator 30 from the housing 20C.

In a case of using the coming-off preventing member, a hybrid inflator may be configured as a hybrid inflator 10D according to a fifth embodiment shown in FIGS. 13 to 15B.

In the hybrid inflator 10D, a coming-off preventing member 67D similar to the coming-off preventing member 67 of the inflator 10C according to the fourth embodiment is used, and a cap 79 that is made of a synthetic resin and covers an outer peripheral surface 11c of the end portion (bottom portion) 11a of the bottle 11 from an outer peripheral surface 69a of the tubular portion 69 of the coming-off preventing member 67D through the outer peripheral surface 21c of the housing 20D is disposed.

In the case of the fifth embodiment, the cap 79 is disposed so as to be fitted to the outer peripheral surface 69a side of the coming-off preventing member 67D as a tubular member having a slight elongation made of a synthetic resin such as polyacetal or polyamide.

In the hybrid inflator 10D according to the fifth embodiment, when the cap 79 is broken and then the coming-off preventing member 67D is turned to be removed from the housing 20D, the bottom wall portion 68 of the coming-off preventing member 67D which has been in contact with the bottom surface 41c side of the gas generator 30 is removed, and the gas generator 30 can be taken out from the housing 20D. Further, while a new gas generator 30 is fitted into the housing recessed portion 21a of the housing 20D, and the bottom wall portion 68 of the coming-off preventing member 67D is brought into contact with the bottom surface 41c side of the new gas generator 30, the female screw portion 73 of the tubular portion 69 of the coming-off preventing member 67D is screwed into the male screw portion 72 on the outer peripheral surface 21c side of the housing 20D, whereby the new gas generator 30 can be assembled to the housing 20D to be reused. Next, when a new cap 79 is covered from the outer peripheral surface 69a of the tubular portion 69 of the coming-off preventing member 67D to the outer peripheral surface 1c of the end portion (bottom portion) 11a of the bottle 11 through the outer peripheral surface 21c of the housing 20D, the hybrid inflator 10D in which the bottle 11 in which the pressurized gas G is sealed and the housing 20D are reused can be easily formed.

In the hybrid inflator 10D according to the fifth embodiment, since the cap 79 hides a vicinity of the male screw portion 72 of the housing 20D into which the coming-off preventing member 67D is screwed, it is difficult to visually recognize an attachment state of the coming-off preventing member 67D to the housing 20D, and it is possible to prevent an outsider from removing the gas generator 30 from the housing 20D.

The cap 79 of the fifth embodiment is broken and the gas generator is removed during the removal of the gas generator 30, and a new cap 79 is covered after the new gas generator 30 is replaced, in order to reuse the inflator main body 10a of the hybrid inflator 10D, but the cap 79 may be disposed by molding at the beginning of manufacture of the hybrid inflator 10D. Then, even after the subsequent replacement of the gas generator 30, the cap 79 may be disposed by molding, or the cap 79 in a tube shape may be disposed in advance so as to be fitted to the outer peripheral surface 69a side and the outer peripheral surface 11c side of the coming-off preventing member 67D and the bottle 11.

In the case of using the coming-off preventing member, a hybrid inflator may be configured as a hybrid inflator 10E according to a sixth embodiment shown in FIGS. 16 to 18B. The hybrid inflator 10E also has a fitting shape in which the gas generator 30 is fittable to the housing recessed portion 21a of the housing 20E, and includes a coming-off preventing member 67E that prevents the gas generator 30 fitted to the housing recessed portion 21a from coming off the housing recessed portion 21a. The housing recessed portion 21a of the housing 20E includes the receiving surface 21d that receives the outer peripheral edge 42a of the ceiling portion 42 of the holder 40E when the gas generator 30 is housed, and has a shape to which the holder 40E is fittable.

In the hybrid inflator 10E, the front end portion 20b side of the housing 20E is joined to the bottom portion 11a side of the bottle 11 by welding at the fixing portion 12. Such a joining mode in which the front end portion 20b side of the housing 20E is joined to the bottom portion 11a side of the bottle 11 may be applied to the hybrid inflators 10, 10A, and 10B of a type in which the gas generator 30 is screwed and assembled to the housings 20, 20A, and 20B as in the first to third embodiments.

Similar to the coming-off preventing member 67 according to the fourth embodiment, the coming-off preventing member 67E is made of a metal such as steel, and includes the bottom wall portion 68 that comes into contact with the bottom surface 41c side of the gas generator 30 when the gas generator 30 is fitted to the housing recessed portion 21a, and the tubular portion 69 that extends from the outer peripheral edge of the bottom wall portion 68 and has the inner peripheral surface provided with the female screw portion 73 that is screwed into the male screw portion 72 provided on the outer peripheral side of the housing 20E. The bottom wall portion 68 includes the insertion hole 68a through which the connector recessed portion 45 of the holder 40E is opened. Further, the tubular portion 69 itself extending from the bottom wall portion 68 serves as an assembling operation portion 76E having a pentagonal prism shape, and the coming-off preventing member 67E is rotatable by using a dedicated tool SE (see FIGS. 18A and 18B) having the fitting opening portion Sa that is fittable to the assembling operation portion 76E.

Also in the hybrid inflator 10E according to the sixth embodiment, when the fitting opening portion Sa of the dedicated tool SE is fitted to the assembling operation portion 76E of the coming-off preventing member 67E, the dedicated tool SE is operated, and the coming-off preventing member 67E is turned and removed from the housing 20E, the bottom wall portion 68 of the coming-off preventing member 67E which has been in contact with the bottom surface 41c side of the gas generator 30 is removed, and the gas generator 30 can be taken out from the housing 20E. Further, while a new gas generator 30 is fitted into the housing recessed portion 21a of the housing 20E, and the bottom wall portion 68 of the coming-off preventing member 67E is brought into contact with the bottom surface 41c side of the new gas generator 30, the female screw portion 73 of the tubular portion 69 of the coming-off preventing member 67E is screwed into the male screw portion 72 on the outer peripheral surface 21c side of the housing 20E while fitting the fitting opening portion Sa of the dedicated tool SE into the assembling operation portion 76E and turning the dedicated tool SE, whereby the new gas generator 30 can be assembled to the housing 20E to be reused, and the hybrid inflator 10E in which the bottle 11 in which the pressurized gas G is sealed and the housing 20E are reused can be easily formed.

Of course, also in the hybrid inflator 10E according to the sixth embodiment, the coming-off preventing member 67E can be reused.

Although the assembling operation portion 76E is also illustrated as having a pentagonal prism shape, the assembling operation portion 76E is not limited to the pentagonal prism shape as long as the assembling operation portion 76E corresponds to a predetermined dedicated tool, may have a triangular prism shape or the like, and may have a shape having a concave portion or a concave-convex portion corresponding to a dedicated tool instead of a prism shape.

Figure 19:
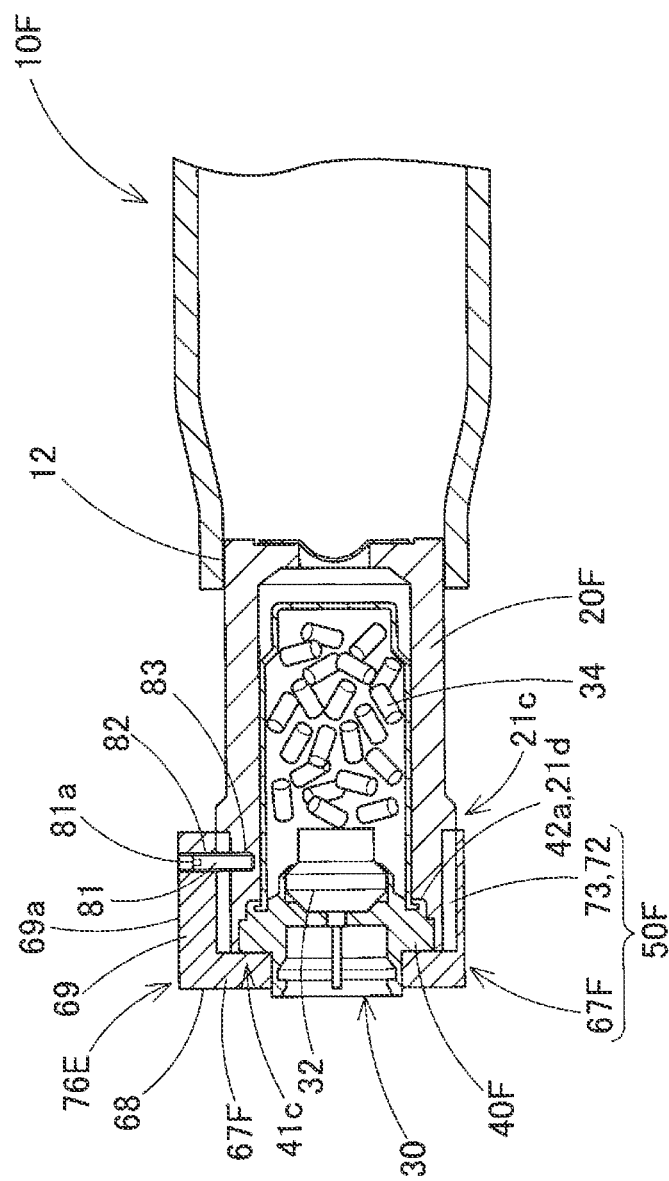
FIG. 19 is a schematic enlarged partial longitudinal sectional view of a hybrid inflator according to a seventh embodiment.

In the case of using the coming-off preventing member, as in a hybrid inflator 10F according to a seventh embodiment shown in FIG. 19, a fixing screw 81 formed of a set screw which is screwed and inserted into the housing 20F from the outer peripheral surface 69a side of the coming-off preventing member 67F may be disposed. A through hole 82 through which the fixing screw 81 passes is disposed in the tubular portion 69 of the coming-off preventing member 67F, and a screw hole 83 into which the fixing screw 81 is screwed is formed in the housing 20F. The fixing screw 81 is provided with an operation portion 81a having a cross-shaped hole on an end surface side, and is used as a single screw.

In the hybrid inflator 10F, during the removal of the gas generator 30, the fixing screw 81 is turned by using a jig corresponding to the operation portion 81a to pull out the fixing screw 81 from the screw hole 83 or the through hole 82, and the coming-off preventing member 67F is further turned to remove the female screw portion 73 of the coming-off preventing member 67F from the male screw portion 72 of the housing 20F, so that the bottom wall portion 68 of the coming-off preventing member 67F which has been in contact with the bottom surface 41c side of the gas generator 30 is removed, and the gas generator 30 can be taken out from the housing 20F. Further, while the new gas generator 30 is fitted into the housing recessed portion 21a of the housing 20F and the bottom wall portion 68 of the coming-off preventing member 67F is brought into contact with the bottom surface 41c side of the new gas generator 30, the female screw portion 73 of the tubular portion 69 of the coming-off preventing member 67F is screwed into the male screw portion 72 on the outer peripheral surface 21c side of the housing 20F while fitting the fitting opening portion Sa of the dedicated tool SE (see FIGS. 18A and 18B) to the assembling operation portion 76E and turning the dedicated tool SE, and the fixing screw 81 is turning by using a jig corresponding to the operation portion 81a, and is inserted into the screw hole 83 through the through hole 82, whereby the new gas generator 30 can be assembled to the housing 20F to be reused, and the hybrid inflator 10F in which the bottle 11 in which the pressurized gas G is sealed and the housing 20E are reused can be easily formed.

Further, in the hybrid inflator 10F, in addition to the same operation and effect as those of the sixth embodiment, the fixing screw 81 makes it difficult for the gas generator 30 to come off from the housing 20F, and the assembly strength of the gas generator 30 with respect to the housing 20F can be improved. In addition, since the fixing screw 81 is formed of a set screw, it is difficult to visually observe the fixing screw 81, and it is possible to prevent an outsider from removing the gas generator 30 from the housing.

Although the hybrid inflators 10, 10A, 10B, 10C, 10D, 10E, and 10F used in the curtain airbag device have been described in the respective embodiments, the hybrid inflator according to the present invention is not limited to the curtain airbag device, and may be used in a knee protection airbag device, a side airbag device, a pedestrian protection airbag device, and the like.

What is claimed is:

1. A hybrid inflator comprising:
a gas generator including a holder, a squib held by the holder and a gas generating agent that generates a combustion gas due to ignition of the squib;
a housing in which an outflow port through which the combustion gas is capable of flowing out is provided on a front end portion side of the housing;
a bottle configured to cover the housing at a side of the outflow port, hold the housing, and be provided with a gas discharge port portion having a discharge port for discharging a pressurized gas, in which the pressurized gas is sealed; and
two breakable lid bodies respectively provided at the outflow port and a sealed portion side of the pressurized gas in the bottle in the gas discharge port portion,
wherein the housing houses the gas generator in a housing recessed portion provided at a side of a bottom portion of the housing,
wherein the two breakable lid bodies separate the sealed portion of the pressurized gas in the bottle from outside,
wherein when the hybrid inflator is activated, the two breakable lid bodies are broken by generation of the combustion gas of the gas generating agent by ignition of the squib in the gas generator, and whereby the pressurized gas is discharged from the discharge port of the gas discharge port portion,
wherein the gas generator is detachably assembled to the housing with respect to the housing recessed portion of the housing,
wherein an assembly structure of the gas generator and the housing is a structure in which the gas generator is attached to and detached from the housing so that the bottle and the housing held by the bottle are reusable, and
wherein the assembly structure is a bayonet structure having a claw portion provided at the holder and a groove portion provided in the housing recessed portion of the housing and into which the claw portion is inserted and locked.

2. The hybrid inflator according to claim 1,
wherein a fixing screw to be screwed and inserted into the holder from an outer peripheral surface side of the housing is disposed, and
wherein the fixing screw is a set screw.

3. The hybrid inflator according to claim 1,
wherein the assembly structure has a fitting shape in which the gas generator is fittable to the housing recessed portion of the housing, and includes a coming-off preventing member configured to prevent the gas generator fitted to the housing recessed portion from coming off the housing recessed portion, and
wherein the coming-off preventing member includes a bottom wall portion that comes into contact with a bottom surface side of the gas generator, and a tubular portion that extends from an outer peripheral edge of the bottom wall portion and has an inner peripheral surface provided with a female screw portion that is screwed into a male screw portion provided on an outer peripheral side of the housing.

4. The hybrid inflator according to claim 3,
wherein a cap is made of a synthetic resin and is disposed to cover an area from an outer periphery of the tubular portion of the coming-off preventing member to an outer periphery of an end portion of the bottle through an outer peripheral surface of the housing.

5. The hybrid inflator according to claim 3,
wherein a fixing screw to be screwed and inserted into the housing from an outer peripheral surface side of the coming-off preventing member is disposed, and
wherein the fixing screw is a set screw.

6. The hybrid inflator according to claim 1,
wherein a portion of the holder to be assembled to the housing is formed to be fitted to a fitting opening of a dedicated tool so that the dedicated tool is used as a tool for an assembly operation.

7. The hybrid inflator according to claim 3,
wherein a portion of the coming-off preventing member to be assembled to the housing is formed to be fitted to a fitting opening of a dedicated tool so that the dedicated tool is used as a tool for an assembly operation.

* * * * *